United States Patent
Enami et al.

(10) Patent No.: US 7,496,266 B2
(45) Date of Patent: Feb. 24, 2009

(54) FILM WAVEGUIDE, METHOD OF MANUFACTURING FILM WAVEGUIDE, AND ELECTRONIC DEVICE

(75) Inventors: Akira Enami, Nara (JP); Yoshihisa Ishida, Nara (JP); Tamio Fujisaki, Nara (JP); Hayami Hosokawa, Kyoto (JP)

(73) Assignee: OMRON Corporation, Kyoto (JP)

( * ) Notice: Subject to any disclaimer, the term of this patent is extended or adjusted under 35 U.S.C. 154(b) by 5 days.

(21) Appl. No.: 11/630,229

(22) PCT Filed: Jun. 27, 2005

(86) PCT No.: PCT/JP2005/011771

§ 371 (c)(1),
(2), (4) Date: Jun. 20, 2007

(87) PCT Pub. No.: WO2006/001434

PCT Pub. Date: Jan. 5, 2006

(65) Prior Publication Data

US 2008/0193094 A1 Aug. 14, 2008

(30) Foreign Application Priority Data

Jun. 25, 2004 (JP) .............................. 2004-189035

(51) Int. Cl.
*G02B 6/10* (2006.01)
*B29D 11/00* (2006.01)
*B05D 5/06* (2006.01)

(52) U.S. Cl. ....................... 385/130; 385/129; 385/131; 385/132; 264/1.24; 427/163.2

(58) Field of Classification Search ............ 385/13–14, 385/49, 129–132; 264/1.24; 427/163.2
See application file for complete search history.

(56) References Cited

U.S. PATENT DOCUMENTS

| 6,355,198 | B1 * | 3/2002 | Kim et al. ..................... 264/259 |
| 6,677,175 | B2 * | 1/2004 | Zhao et al. ..................... 438/31 |
| 6,807,328 | B2 * | 10/2004 | Farah ........................... 385/14 |
| 6,990,263 | B2 * | 1/2006 | Shimizu et al. ................ 385/14 |
| 7,050,691 | B2 * | 5/2006 | Ishizaki et al. ............... 385/132 |

* cited by examiner

Primary Examiner—Frank G Font
Assistant Examiner—Guy G Anderson
(74) Attorney, Agent, or Firm—Osha • Liang LLP

(57) ABSTRACT

A method of manufacturing a film waveguide includes supplying a precursor consisting of monomer or oligomer of an elastomer having a flexural modulus after curing smaller than or equal to 1,000 MPa to a substrate; pressing a stamper on the precursor of the elastomer, applying pressure to the precursor of the elastomer by the stamper and thinning a film thickness of the precursor of the elastomer; forming a lower clad layer by curing the precursor of the elastomer; forming a core on the lower clad layer; and forming an upper clad layer on the lower clad layer and the core. A film waveguide has at least one of a lower clad layer or an upper clad layer formed by an elastomer having a flexural modulus smaller than or equal to 1,000 MPa. A sum of film thicknesses of the clad layers is less than or equal to 300 mm.

4 Claims, 29 Drawing Sheets

(a)

(b)

FILM WAVEGUIDE, METHOD OF MANUFACTURING FILM WAVEGUIDE, AND ELECTRONIC DEVICE

TECHNICAL FIELD

The present invention relates to a film waveguide and a method of manufacturing the same. The present invention also relates to an electronic device using the film waveguide.

BACKGROUND ART

Advancement in optical communication technique enabling large volume data communication at high speed is becoming significant in recent years, and the optical communication network thereof is also continuously expanding. The optical communication technique is used in long range communications traversing the country and in medium range communications within a region, but is also used in short communication range such as optical signal transmission etc. inside the device or between devices.

Wiring must be performed so as to thread through a narrow gap between components since various components are closely arranged in portable devices, compact devices and the like. Thus, a flexible print wiring substrate is being widely used for the electrical wiring. Similarly, a flexible film waveguide is desired for transmitting the optical signal at a short distance such as inside the device, and between devices. In particular, when wiring the waveguide inside the portable compact device, wiring is often performed so as to lie on the surface of the part to reduce space, and thus a polymer film waveguide that can be bent with a small curvature radius is desired.

The material that has high flexural performance and that is easily deformable includes elastomer. Elastomer is a generic term for polymer material having rubber elasticity at normal temperature, and generally refers to materials having low flexural modulus such as rubber. The reason why the low flexural modulus of the elastomer is low will now be described. Elastomer has low glass transition temperature, and the polymer molecules thereof perform Brownian motion at room temperature. That is, elastomer has fluidity. Although the polymer molecules constituting the elastomer exhibit fluidity since the molecule chains thereof are chemically cross-linked, such fluidity is partial. Therefore, the elastomer has a rubber property of being easily bendable although it is a solid.

The elastomer is obtained by curing the monomer or the oligomer, which is the precursor thereof, by irradiating energy. Most elastomer have the monomer or the oligomer bonded and cross linked by hydrogen bonding of hydrophilic groups, and most precursors thereof contain hydrophilic groups in the molecules. The mixture of the precursor has lower fluidity since the hydrophilic groups hydrogen bond and exhibit the property of high viscosity. When the mixture of the precursor thereof is cured by energy irradiation, it becomes an elastomer of rubber form having small bending elasticity.

Therefore, a film waveguide that can be bent with a small curvature radius is assumed to be manufactured using the elastomer. FIGS. 1(a) to 1(g) are schematic cross sectional views describing the method of manufacturing the conventionally proposed film waveguide. In such manufacturing method, the clad material 12 is first dropped onto a substrate 11, as shown in FIG. 1(a). The clad material 12 is monomer or oligomer, which is the precursor of the elastomer having low refraction index. Subsequently, the clad material 12 on the substrate 11 is spread thinly by a spin coater, and the clad material 12 is cured by energy irradiation to obtain the clad layer 13, as shown in FIG. 1(b). Thereafter, the surface of a lower clad layer 13 is patterned and a concave groove 14 is formed, as shown in FIG. 1(c), and a core material 15 having a refraction index higher than the lower clad layer 13 is filled into the concave groove 14, as shown in FIG. 1(d). The core material 15 is monomer or oligomer, which is the precursor of the polymer having a refraction index higher than the lower clad layer 13. When the energy is irradiated onto the core material 15, the core material 15 is cured, and the core 16 having a refraction index higher than the lower clad layer 13 is formed in the concave groove 14, as shown in FIG. 1(e). As shown in FIG. 1(f), the clad material 12 (precursor of elastomer) same as the lower clad layer 13 is dropped onto the lower clad layer 13 and the core 16, and then thinly spread by spin coating, and thereafter, the clad material 12 is cured by irradiating energy, and the upper clad layer 17 made up of clad material 12 is formed, whereby the film waveguide 18 is manufactured, as shown in FIG. 1(g).

The elastomer having the low flexural modulus of smaller than or equal to 1,000 MPa is desirably used for the film waveguide that can be bent at a small curvature radius. However, since the viscosity becomes high or about 1,000 cP (=10 Pa·s) in the precursor of such elastomer, if the relevant elastomer is used for the upper clad layer 17 and for the lower clad layer 13, the film thickness of the clad layer obtained by spin coating can only be thinned to about 600 μm at the most, and thus the thin film waveguide having a thickness of smaller than or equal to 1,200 μm is difficult to obtain. Thus, even if the elastomer having the low flexural modulus of smaller than or equal to 1,000 MPa is used, it cannot be bent at small curvature radius due to its thickness.

The film thickness of the clad layer obtained by spin coating can be thinned by reducing the viscosity of the precursor of the elastomer. However, if the viscosity of the precursor of the elastomer is reduced, the low flexural modulus of the elastomer (clad layer) after curing increases, and consequently, the film waveguide that can be bent at small curvature radius becomes difficult to obtain.

Therefore, in the conventional method of manufacturing the film waveguide using the spin coating method, the film thickness of the clad layer cannot be thinned if the elastomer which viscosity of the precursor is high is used, and the low flexural modulus of the clad layer increases if the elastomer which viscosity of the precursor is low is used. In either case, the film waveguide that can be bent at a small curvature radius or the curvature radius of about a few mm cannot be manufactured.

When attempting to obtain the thin film waveguide 18 in such manufacturing method, there is only the method of thinning the lower clad layer 13 or the upper clad layer 17 through polishing etc. after curing the lower clad layer 13 or after curing the upper clad layer 17, but such method requires a great number of steps to obtain the thin film waveguide 18 and thus is disadvantageous in terms of productivity.

Patent Document 1 discloses the waveguide that uses urethane ultraviolet curable resin as the core material, which waveguide has a thickness of 1.5 mm only with one clad substrate and thus cannot be expected to be bent at small curvature radius.

Patent Document 1: Japanese Laid-Open Patent Publication No. 10-90532

DISCLOSURE OF THE INVENTION

The present invention aims to provide, in view of the technical problems such as the above, a film waveguide that can be bent at a small curvature radius and a method of manufacturing the same.

A film waveguide according to the present invention has at least one of a lower clad layer or an upper clad layer formed by an elastomer having a low flexural modulus of smaller than or equal to 1,000 MPa, and the sum of the film thicknesses of the upper clad layer and the lower clad layer is less than or equal to 300 μm.

In the film waveguide of the present invention, the film waveguide can be bent at a small curvature radius (smaller than or equal to a few mm) since at least the upper clad layer or the lower clad layer is formed by elastomer having the low flexural modulus of greater than or equal to 1,000 MPa, and the sum of the film thicknesses of the upper and lower clad layer is less than or equal to 300 μm. Therefore, the film waveguide can be wired along the surface of the component or thread through the gap between the components in the portable compact device.

In a certain embodiment of the film waveguide of the present invention, a core may be formed between the lower clad layer and the upper clad layer by an elastomer having a refraction index higher than the clad layers and having a low flexural modulus of smaller than or equal to 1,000 MPa. If the core is formed by the elastomer having the low flexural modulus of smaller than or equal to 1,000 MPa, the core is also easily bent, and thus the film waveguide can be bent at a small curvature radius.

In another embodiment of the film waveguide of the present invention, the low flexural modulus of the core is greater than the low flexural modulus of the upper clad layer and the lower clad layer. In such embodiment, since the low flexural modulus of the core is greater than the low flexural modulus of the upper clad layer and the lower clad layer, the deformation of the core can be suppressed small even if the film waveguide is stretched or twisted, and the loss of light propagating through the core can be reduced.

A method of manufacturing a first film waveguide of the present invention includes the steps of supplying a precursor consisting of monomer or oligomer of an elastomer having a low flexural modulus after curing of smaller than or equal to 1,000 MPa to a substrate; pressing a stamper on the precursor of the elastomer, applying pressure to the precursor of the elastomer by the stamper and thinning the film thickness of the precursor of the elastomer; forming a lower clad layer by curing the precursor of the elastomer; forming a core on the lower clad layer; and forming an upper clad layer on the lower clad layer and the core. The substrate is not limited to a glass substrate and the like for molding the lower clad layer, and may be a board of a device for molding the lower clad layer. The substrate is desirably removed from the film waveguide at the end.

If the elastomer having the low flexural modulus of smaller than or equal to 1,000 MPa is used, the viscosity of the precursor of the elastomer becomes relatively high, and thus becomes difficult to thin the thickness of the clad layer formed by the elastomer. However, in the method of manufacturing the first film waveguide of the present invention, the lower clad layer having a thin film thickness (e.g., film thickness of smaller than or equal to 150 μm) is obtained by pressing and thinning the precursor of the elastomer with a stamper while using the elastomer having a low flexural modulus of smaller than or equal to 1,000 MPa. Therefore, according to the present invention, the lower clad layer having a low flexural modulus of smaller than or equal to 1,000 MPa and having a thin thickness is obtained, and the film waveguide that can be bent at a small curvature radius is manufactured.

A method of manufacturing a second film waveguide of the present invention includes the steps of forming a lower clad layer; forming a core on the lower clad layer; supplying a precursor consisting of monomer or oligomer of an elastomer having a low flexural modulus after curing of smaller than or equal to 1,000 MPa to the lower clad layer and the core; pressing a stamper on the precursor of the elastomer, applying pressure to the precursor of the elastomer by the stamper and thinning the film thickness of the precursor of the elastomer; and forming an upper clad layer by curing the precursor of the elastomer.

In the method of manufacturing the second film waveguide of the present invention, the upper clad layer having a thin film thickness (e.g., film thickness of smaller than or equal to 150 μm) is obtained by pressing and thinning the precursor of the elastomer with a stamper while using the elastomer having a low flexural modulus of smaller than or equal to 1,000 MPa. Therefore, according to the present invention, the upper clad layer having a low flexural modulus of smaller than or equal to 1,000 MPa and having a thin thickness is obtained, and the film waveguide that can be bent at a small curvature radius is manufactured.

A method of manufacturing a third film waveguide according to the present invention includes the steps of supplying a precursor consisting of monomer or oligomer of an elastomer having a low flexural modulus after curing of smaller than or equal to 1,000 MPa to a first substrate; pressing a stamper on the precursor of the elastomer, applying pressure to the precursor of the elastomer by the stamper and thinning the film thickness of the precursor of the elastomer; forming a lower clad layer by curing the precursor of the elastomer; supplying a precursor consisting of monomer or oligomer of an elastomer having a low flexural modulus after curing of smaller than or equal to 1,000 MPa to a second substrate; pressing a stamper on the precursor of the elastomer supplied to the second substrate, applying pressure to the precursor of the elastomer by the stamper and thinning the film thickness of the precursor of the elastomer; forming an upper clad layer by curing the precursor of the elastomer supplied to the second substrate; and laminating the lower clad layer and the upper clad layer so as to sandwich a core formed in the lower clad layer or the upper clad layer. The substrate is not limited to a glass substrate and the like for molding the upper clad layer or the lower clad layer, and may be a board of a device for molding the upper clad layer or the lower clad layer. The substrate is desirably removed from the film waveguide at the end.

In the method of manufacturing the third film waveguide of the present invention, the upper clad layer and the lower clad layer having a thin film thickness (e.g., film thickness of smaller than or equal to 150 μm) is obtained by pressing and thinning the precursor of the elastomer with a stamper while using the elastomer having a low flexural modulus of smaller than or equal to 1,000 MPa. Therefore, according to the present invention, the upper clad layer and the lower clad layer having a flexural modulus of smaller than or equal to 1,000 MPa and having a thin thickness are obtained, and the film waveguide that can be bent at a small curvature radius is manufactured.

Although warp tends to occur at the upper clad layer or the lower clad layer from the internal stress generated by the pressure from the stamper when molding the upper clad layer and the lower clad layer, the upper clad layer is turned upside down and laminated on the lower clad layer after respectively molding the upper clad layer and the lower clad layer by pressing with the stamper according to the method of manufacturing the third film waveguide, and thus the warps of the upper clad layer and the lower clad layer are canceled out and the warp is suppressed from producing in the film waveguide.

A method of manufacturing a fourth film waveguide according to the present invention includes the steps of supplying a precursor consisting of monomer or oligomer of an elastomer having a low flexural modulus after curing of smaller than or equal to 1,000 MPa to a first substrate; pressing a stamper on the precursor of the elastomer, applying pressure to the precursor of the elastomer by the stamper and thinning the film thickness of the precursor of the elastomer; forming a lower clad layer by curing the precursor of the elastomer; supplying a precursor consisting of monomer or oligomer of an elastomer having a flexural modulus after curing of smaller than or equal to 1,000 MPa to a second substrate; pressing a stamper on the precursor of the elastomer supplied to the second substrate, applying pressure to the precursor of the elastomer by the stamper and thinning the film thickness of the precursor of the elastomer; forming an upper clad layer by curing the precursor of the elastomer supplied to the second substrate; and laminating the lower clad layer and the upper clad layer with a core material, and forming a core by the core material between the lower clad layer and the upper clad layer.

In the method of manufacturing the fourth film waveguide of the present invention, the upper clad layer and the lower clad layer having a thin film thickness (e.g., film thickness of smaller than or equal to 150 μm) is obtained by pressing and thinning the precursor of the elastomer with a stamper while using the elastomer having a flexural modulus of smaller than or equal to 1,000 MPa. Therefore, according to the present invention, the upper clad layer and the lower clad layer having a flexural modulus of smaller than or equal to 1,000 MPa and having a thin thickness are obtained, and the film waveguide that can be bent at a small curvature radius is manufactured.

According to the method of manufacturing the fourth film waveguide, since the core is simultaneously molded by the core material by laminating the lower clad layer and the upper clad layer with the core material, the molding of the core with the core material and the joining task of the upper and lower clad layers by the core material are performed all at once, and thus the manufacturing steps of the film waveguide are reduced and the manufacturing steps are rationalized.

A film waveguide module according to the present invention has the film waveguide according to the present invention and a light projecting element or a light receiving element arranged and integrated in order to be optically coupled.

According to the film waveguide module according to the present invention, the film waveguide in which the thickness of the waveguide portion is thin and that excels in the flexural performance is obtained, where when the relevant film waveguide module is incorporated in a device including the rotating portion such as a hinge part, the waveguide portion is less likely to be damaged even if the rotating portion is repeatedly turned, and the durability of the device is enhanced.

A first electronic device according to the present invention is a foldable electronic device having one member and another member coupled in a freely rotating manner by a rotating portion; where the film waveguide according to the present invention is passed through the rotating portion and wired between one member and the other member.

According to the electronic device according to the present invention, the film waveguide having thin thickness and excelling in flexural performance is obtained, where when the relevant waveguide unit is used in the electronic device including the rotating portion such as a hinge part, the film waveguide is less likely to be damaged even if the rotating portion is repeatedly turned, and the durability of the electronic device is enhanced.

A second waveguide unit according to the present invention is an electronic device including a moving part in a device main body, where the moving part and the device main body are optically coupled by way of the film waveguide according to claim 1 or 2.

According to the film waveguide of the present invention, the film waveguide having thin thickness and excelling in flexural performance is obtained, where when the relevant waveguide unit is used in the electronic device including the moving part, the film waveguide is less likely to be damaged even if repeatedly deformed with the movement of the moving part, and the durability of the electronic device is enhanced.

The components described above of the present invention may be arbitrarily combined as much as possible.

BRIEF DESCRIPTION OF THE DRAWINGS

FIG. 20(a) is a view showing a state folded in half, and FIG. 20(b) is a view showing an opened state.

EXPLANATION OF SYMBOLS

Figure 1:
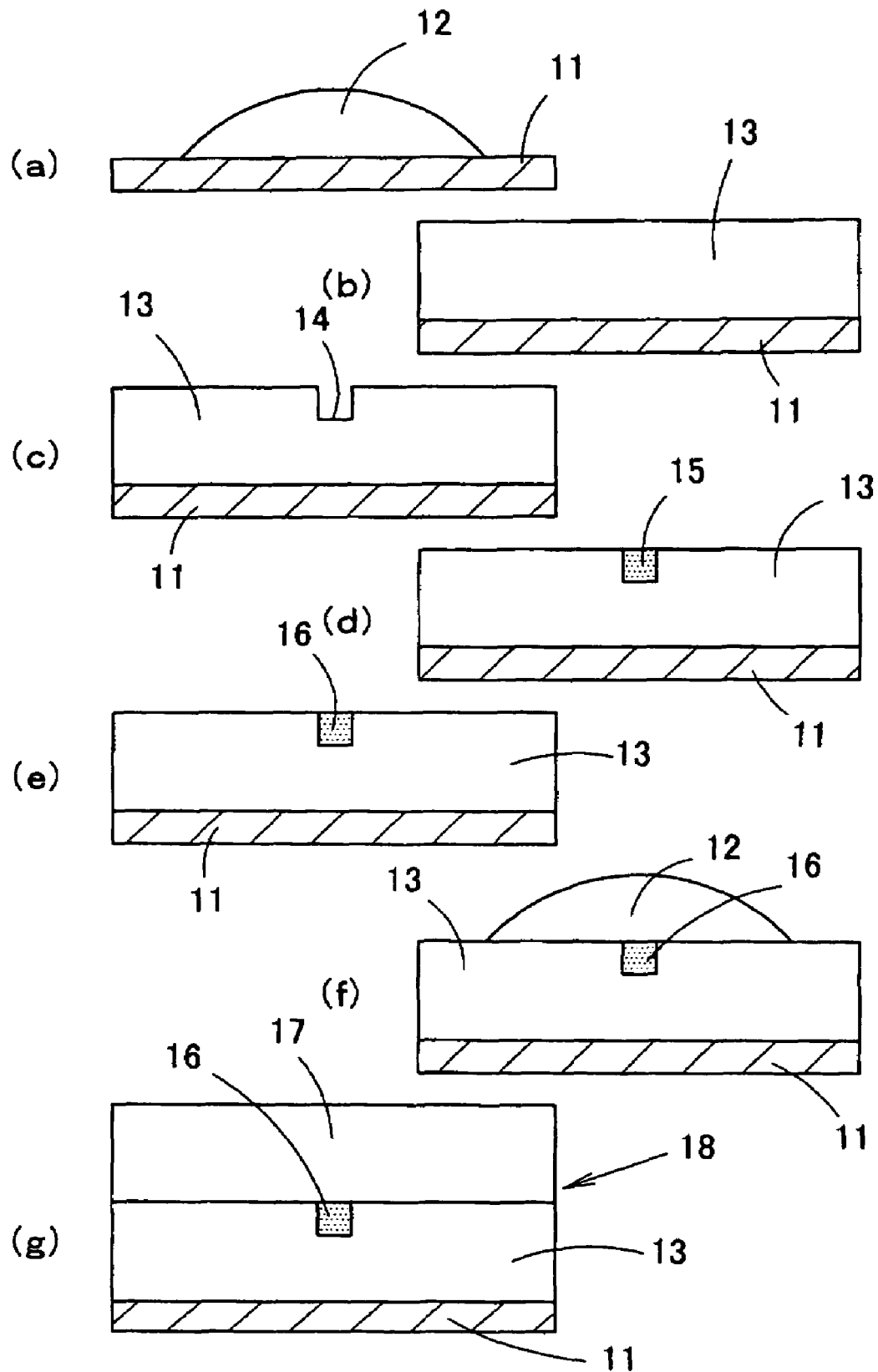
FIGS. 1(a) to 1(g) are schematic cross sectional views describing the method of manufacturing a film waveguide according to a conventional example.

21 Substrate
22 Clad material
23 Stamper
24 Convex pattern
25 Concave groove
26 Lower clad layer
27 Core material
28 Core
29 Stamper
30 Upper clad layer
31 Film waveguide
32 Substrate
33 Stamper
34 Adhesive resin
35 Film waveguide
36 Film waveguide
37 Stamper
51 Film waveguide

BEST MODE FOR CARRYING OUT THE INVENTION

Embodiments of the present invention will now be described in detail according to the drawings. It should be recognized that the present invention is not to be limited to the following embodiments.

EMBODIMENT 1

Figure 2:
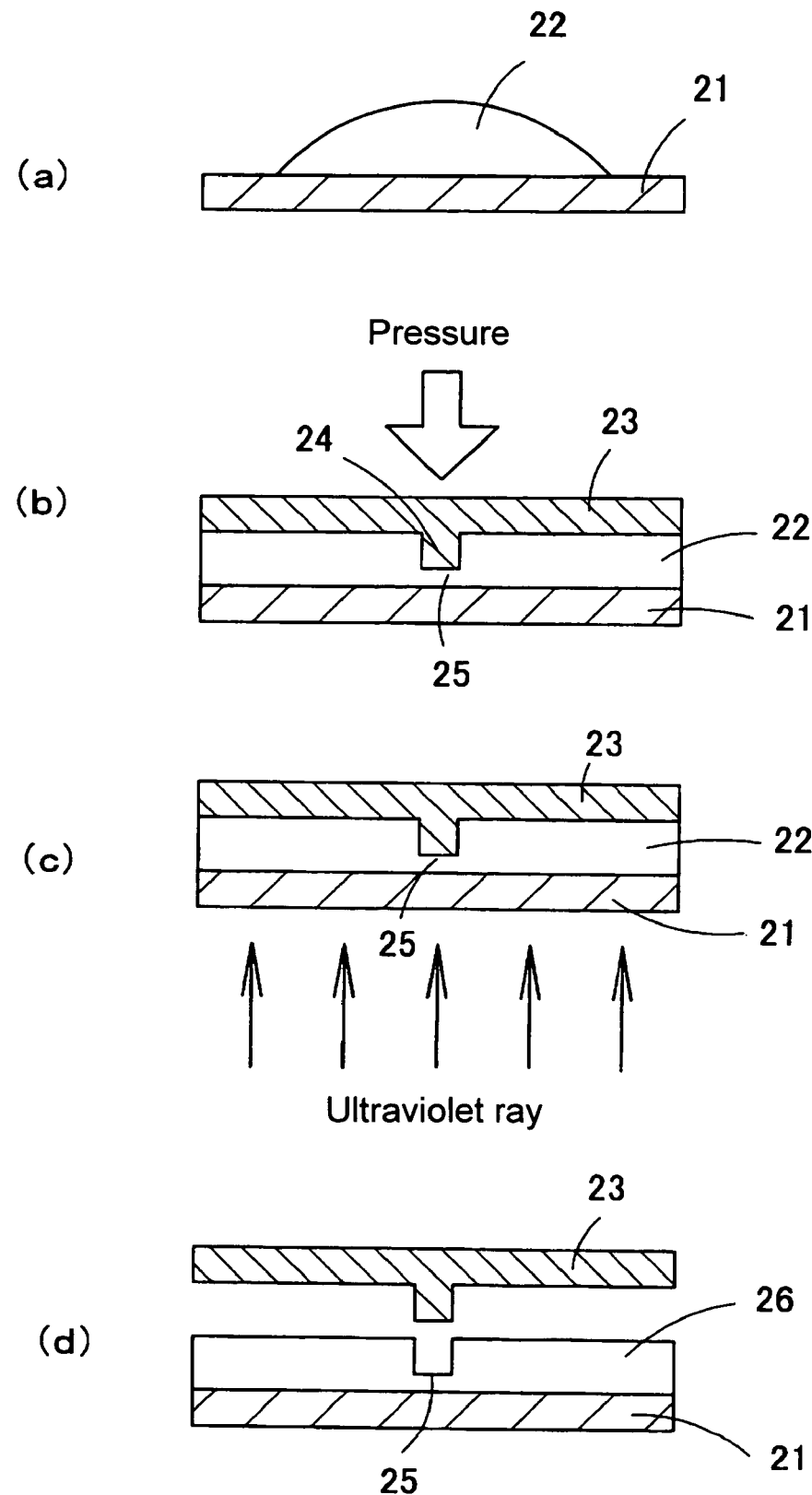
FIGS. 2(a) to 2(d) are schematic explanatory views sequentially describing the manufacturing steps of a film waveguide according to Embodiment 1 of the present invention.
Figure 3:
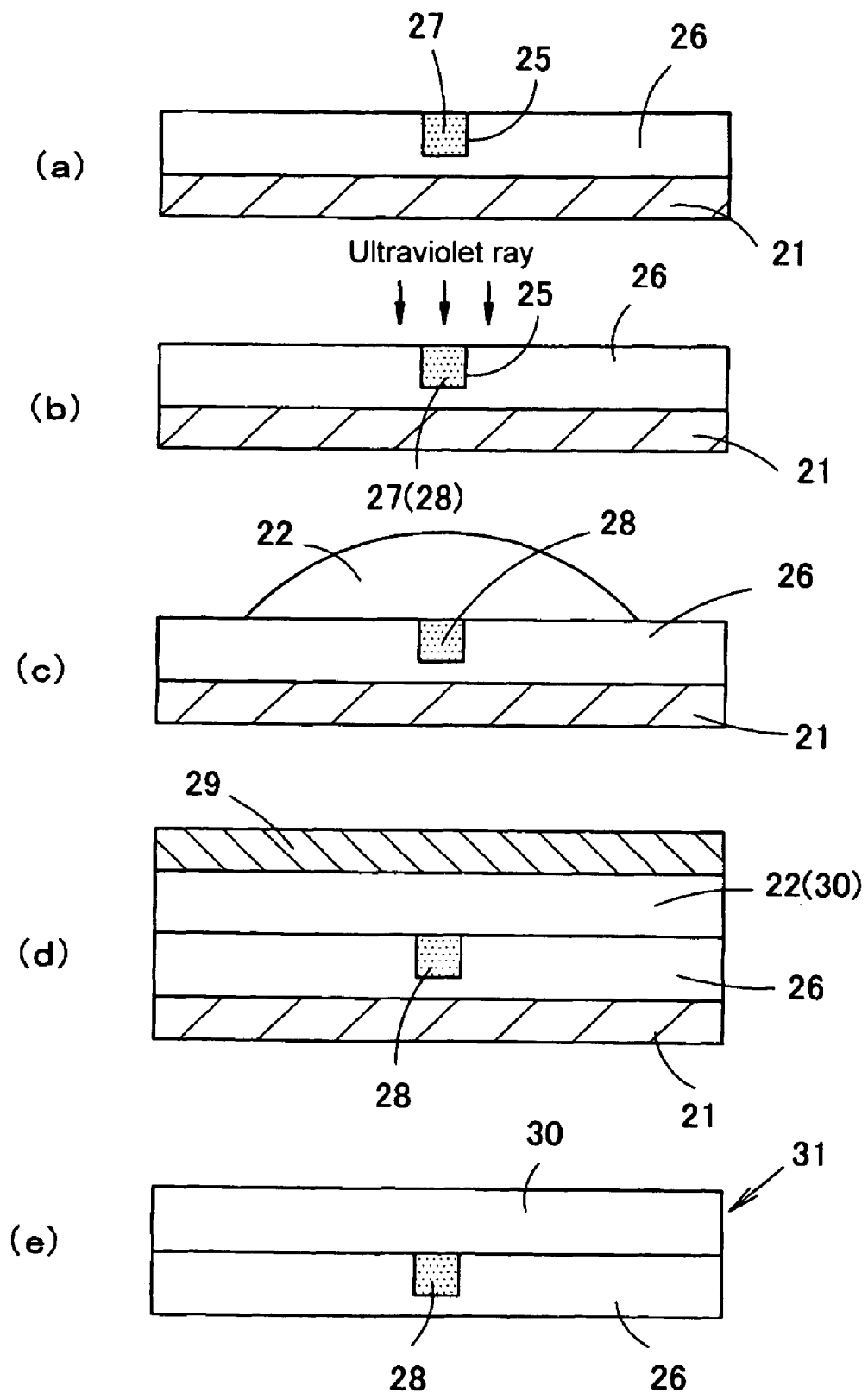
FIGS. 3(a) to 3(e) are schematic cross sectional views describing the steps following FIGS. 2(a) to 2(d).
Figure 4:
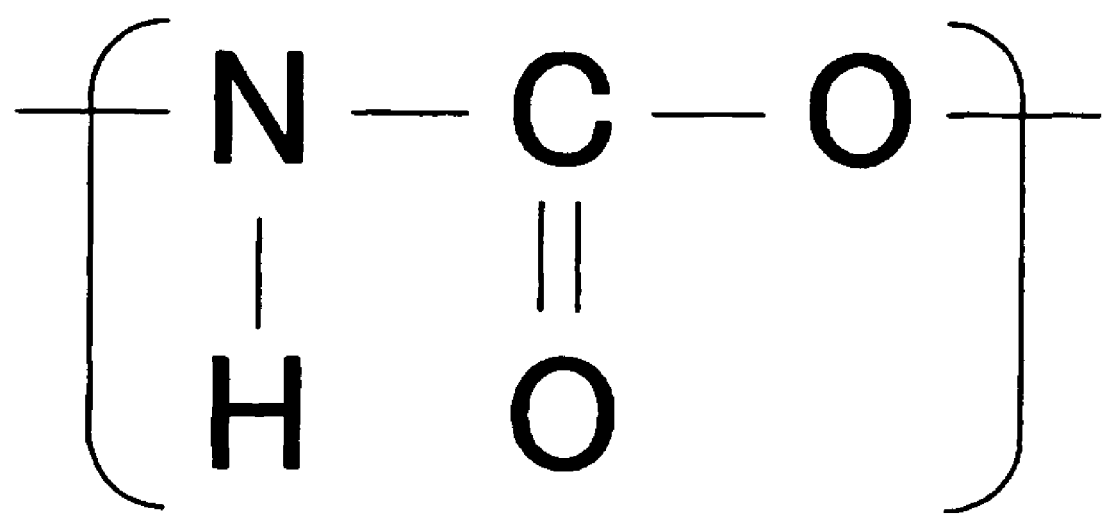
FIG. 4 is a chemical formula indicating one part of a group contained in a monomer and an oligomer of the precursor of the elastomer used in the clad material.

FIGS. 2 and 3 are schematic cross sectional views describing the method of manufacturing a film waveguide according to Embodiment 1 of the present invention. In manufacturing the film waveguide of the present invention, a flat substrate 21 having translucency such as a glass substrate is first prepared. As shown in FIG. 2(a), a clad material 22 is applied on the substrate 21. The clad material 22 used in Embodiment 1 is a mixture of urethane monomer and urethane oligomer containing the group shown in FIG. 4, and polymerization initiator, and is a precursor of an elastomer having the flexural modulus after curing of smaller than or equal to 1,000 MPa. The clad material is ultraviolet curable type.

As shown in FIG. 2(b), a stamper (forming die) 23 is pressed against the clad material 22 from above and pressure is applied to the stamper 23 thereby thinly spreading the clad material 22 between the substrate 21 and the stamper 23, and thinning the film thickness of the clad material 22. A convex pattern 24 for forming a concave groove 25 in the lower clad layer is formed on the lower surface of the stamper 23, whereby the concave groove 25 forms in the upper surface of the clad material 22 when pressed down by the stamper 23. The ultraviolet energy is then irradiated onto the clad material 22 from the lower surface through the substrate 21 to cure the clad material 22, as shown in FIG. 2(c).

After the clad material 22 is cured and the lower clad layer 26 is molded, the stamper 23 is separated from the lower clad layer 26, as shown in FIG. 1(d). When the stamper 23 is separated, the concave groove 25 is formed in the upper surface of the lower clad layer 26 by the convex pattern 24.

The core material 27 is filled into the concave groove 25 of the lower clad layer 26, as shown in FIG. 3(a). The core material 27 is a material consisting of monomer or oligomer, which is the precursor of polymer having a refraction index higher than the lower clad layer 26, and is the precursor of ultraviolet curable polymer. Obviously, the precursor of the elastomer having the refraction index higher than the lower clad layer 26 and having the flexural modulus after curing of smaller than or equal to 1,000 MPa may be used for the core material. After filling the core material 27 into the core groove 25, and smoothly evening the surface of the core material 27 through an appropriate method, the ultraviolet energy is irradiated onto the core material 27 to cure the core material 27, and the core 28 is molded in the concave groove 25 by the core material 27.

Subsequently, the clad material 22 same as that used for the lower clad layer 26 is applied on the lower clad layer 26 and the core 28, as shown in FIG. 3(c), and a stamper 29 is pressed on the clad material 22 from above and pressure is applied thereto thereby thinning the film thickness of the clad material 22, as shown in FIG. 3(d). The ultraviolet energy is then irradiated onto the clad material 22 to cure the clad material 22, thereby molding the upper clad layer 30. The stamper 29 is then separated from the upper clad layer 30, and the substrate 21 is stripped from the lower clad layer 26 to obtain a film, thereby obtaining the film waveguide 31 as shown in FIG. 3(e).

The viscosity of the clad material 22 is desirably low to thin the film thickness of the clad layer. However, since the flexural modulus of the lower clad layer 26 and the upper clad layer 30 is small or 1,000 MPa in the film waveguide 31, the viscosity of the precursor of the elastomer becomes high. In Embodiment 1, the film thickness of the clad material 22 can be forcibly spread thin since the clad material 22 is pressed and pressurized with the stamper 23, whereby the film thickness can be forced to be thinner than or equal to 150 μm even if the viscosity is about 3,0000 cP. Therefore, the thickness of the film waveguide 31 becomes less than or equal to 300 μm, and the film waveguide 31 can be bent at a small curvature radius.

Actually, the thickness of the film waveguide 31 can be thinned to about 250 mm even if the elastomer, which viscosity of the precursor is smaller than or equal to 30,000 cP, is used in the film waveguide 31 of Embodiment 1 using the elastomer having the flexural modulus of 1,000 MPa. As a result, the minimum curvature radius of when the film waveguide 31 is bent along the thickness direction becomes about 3 mm. It is to be noted that if the film waveguide has a smaller curvature radius, the film waveguide will not be curved but will be sharply bent.

When the elastomer having the flexural modulus of smaller than or equal to 500 MPa is used, the obtained film waveguide is bent to the curvature radius of about 2 mm. Furthermore, when the elastomer having the flexural modulus of smaller than or equal to 200 MPa is used, the obtained film waveguide is bent to the curvature radius of about 1 mm.

The clad material 22 supplied on the substrate 21 and the clad material 22 supplied on the lower clad layer 26 are immediately pressed with the stamper 23, 29 in Embodiment 1, but the supplied clad material 22 may be thinned by a spin coater and then pressed and thinned with the stamper 23, 29. The thickness of the upper and lower clad layer 30, 26 can be further thinned, and the minimum bending curvature of the film waveguide can be reduced with the simultaneous use of the spin coater.

The upper clad layer 30 and the lower clad layer 26 are both formed by the elastomer having the flexural modulus of smaller than or equal to 1,000 MPa in Embodiment 1, but only one of either the upper clad layer 30 or the lower clad layer 26 may be formed by the elastomer having the flexural modulus of 1,000 MPa. In this case, modified acrylate resin and the like having the flexural modulus of smaller than or equal to 1,000 MPa may be used for the clad layer on the side not formed by the elastomer.

EMBODIMENT 2

Figure 5:
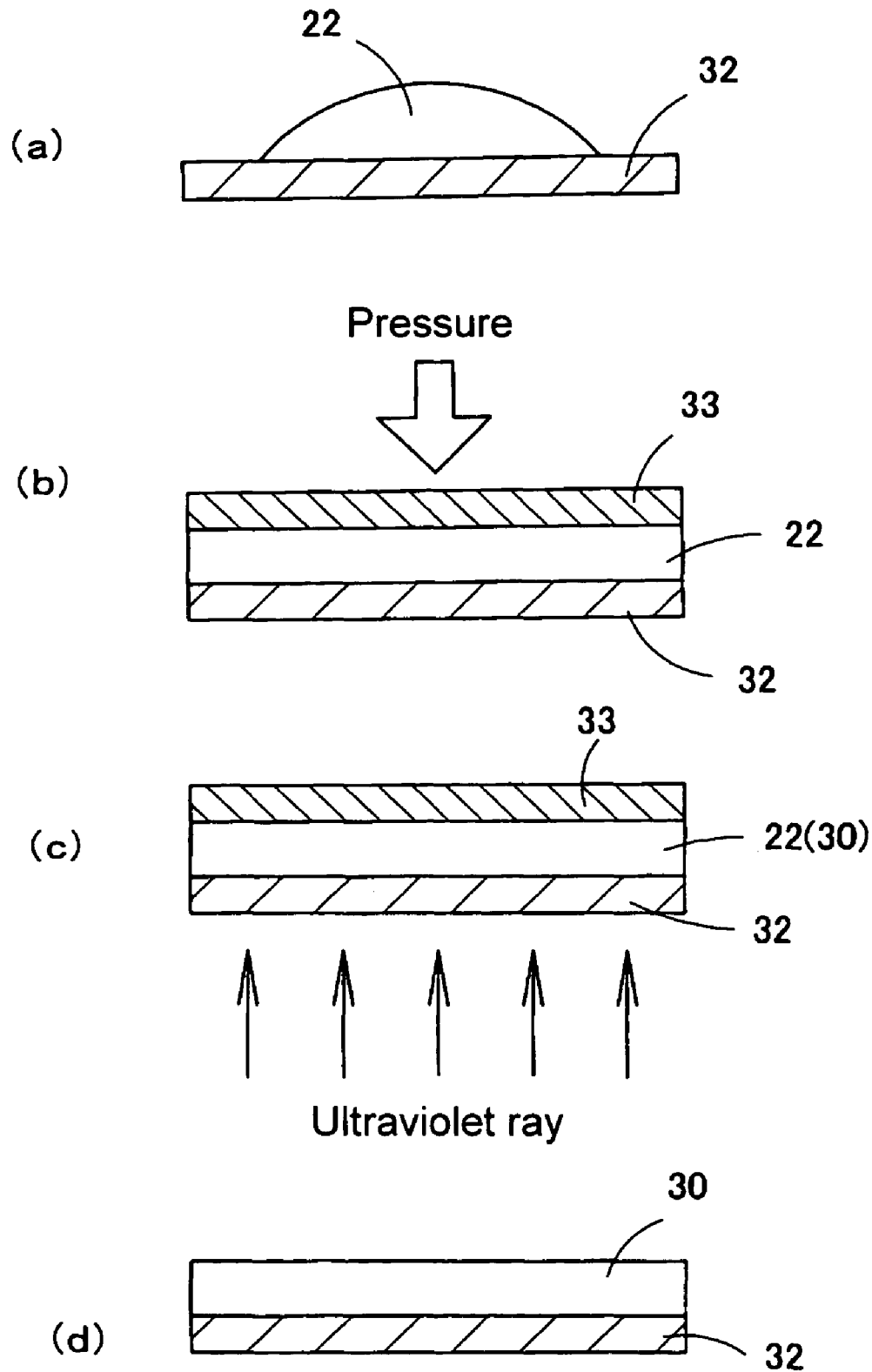
FIGS. 5(a) to 5(d) are schematic cross sectional views showing the manufacturing steps of an upper clad layer in Embodiment 2 of the present invention.
Figure 6:
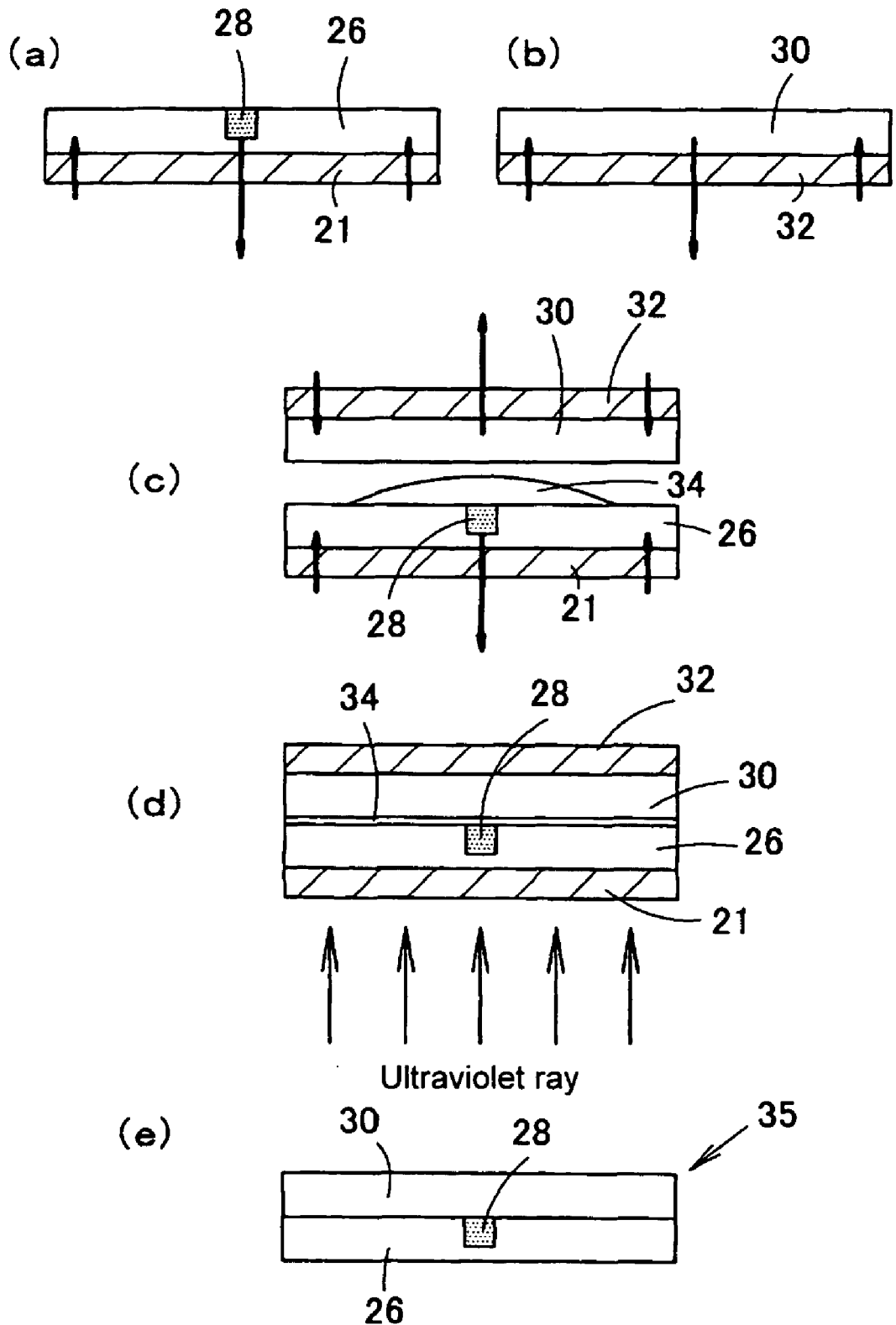
FIGS. 6(a) to 6(e) are schematic cross sectional views describing the steps for manufacturing the film waveguide by stacking a lower clad layer formed on the substrate and an upper clad layer formed on a different substrate in Embodiment 2 of the present invention.

FIGS. 5 and 6 are views describing the method of manufacturing a film waveguide according to Embodiment 2 of the present invention. The lower clad layer 26 shown in FIG. 6(*a*) is a lower clad layer 26 formed on the substrate 21 through steps same as FIG. 2(*a*) to FIG. 3(*b*) of Embodiment 1, and the core 28 is formed on the upper surface thereof.

The upper clad layer 30 shown in FIG. 6(*b*) is that formed on the substrate 32 through steps shown in FIG. 5(*a*) to FIG. 5(*d*). That is, the clad material 22 is applied on a flat substrate 32 having translucency such as a glass substrate, as shown in FIG. 5(*a*). The clad material 22 is a mixture of urethane monomer and urethane oligomer containing the group shown in FIG. 4, and polymerization initiator, and is a precursor of an elastomer having the flexural modulus after curing of smaller than or equal to 1,000 MPa. The clad material is ultraviolet curable type. Thereafter, the stamper 33 of a flat plate shape is pressed on the clad material 22 and pressure is applied on the stamper 33 to thinly spread the clad material 22 and thin the film thickness between the substrate 32 and the stamper 33. The ultraviolet energy is irradiated onto the clad material 22 through the substrate 32 to cure the clad material 22, as shown in FIG. 5(*c*). After the clad material 22 is cured and the upper clad layer 30 is molded, the stamper 33 is separated from the upper clad layer 30, as shown in FIG. 2(*d*). When the stamper 33 is separated, the upper clad layer 30 having a flat upper surface is molded on the substrate 32.

Thereafter, the ultraviolet curable adhesive resin 34 consisting of monomer or oligomer, which is the precursor of the polymer having a refraction index lower than the core material 27, is applied on the lower clad layer 26 and the core 28, the upper clad layer 30 is turned upside down with the substrate 32 and superimposed on the adhesive resin 34, whereby the adhesive resin 34 is sandwiched and thinly spread between the lower clad layer 26 and the upper clad layer 30, as shown in FIG. 6(*c*).

The ultraviolet energy is then irradiated on the adhesive resin 34 through the substrate 21 or 32 to cure the adhesive resin 34, thereby joining the upper clad layer 30 and the lower clad layer 26 with the adhesive resin 34, as shown in FIG. 6(*d*). Finally, the substrates 32, 21 on the front and the back are separated from the upper clad layer 30 and the lower clad layer 26, respectively, to obtain a film, thereby obtaining the film waveguide 35 shown in FIG. 6(*e*).

Since pressure always acts in the same direction at the lower clad layer 26 shown in FIG. 6(*a*) and the upper clad layer 30 shown in FIG. 6(*b*) having thinned film thickness due to pressure application by means of the stamper, an internal stress (or residual moment) as indicated by an arrow in FIGS. 6(*a*) and 6(*b*) generates. Thus, a warp that becomes concave on the upper surface side of FIG. 6(*a*) and FIG. 6(*b*) produces at the lower clad layer 26 and the upper clad layer 30. When the lower clad layer 26 and the upper clad layer 30 are then laminated with the upper clad layer 30 turned upside down as shown in FIG. 6(*c*), the internal stress produced at the upper clad layer 30 and the internal stress of the lower clad layer 26 cancel each other, whereby the warp is less likely to be produced at the film waveguide 35, which is a laminated body.

EMBODIMENT 3

Figure 7:
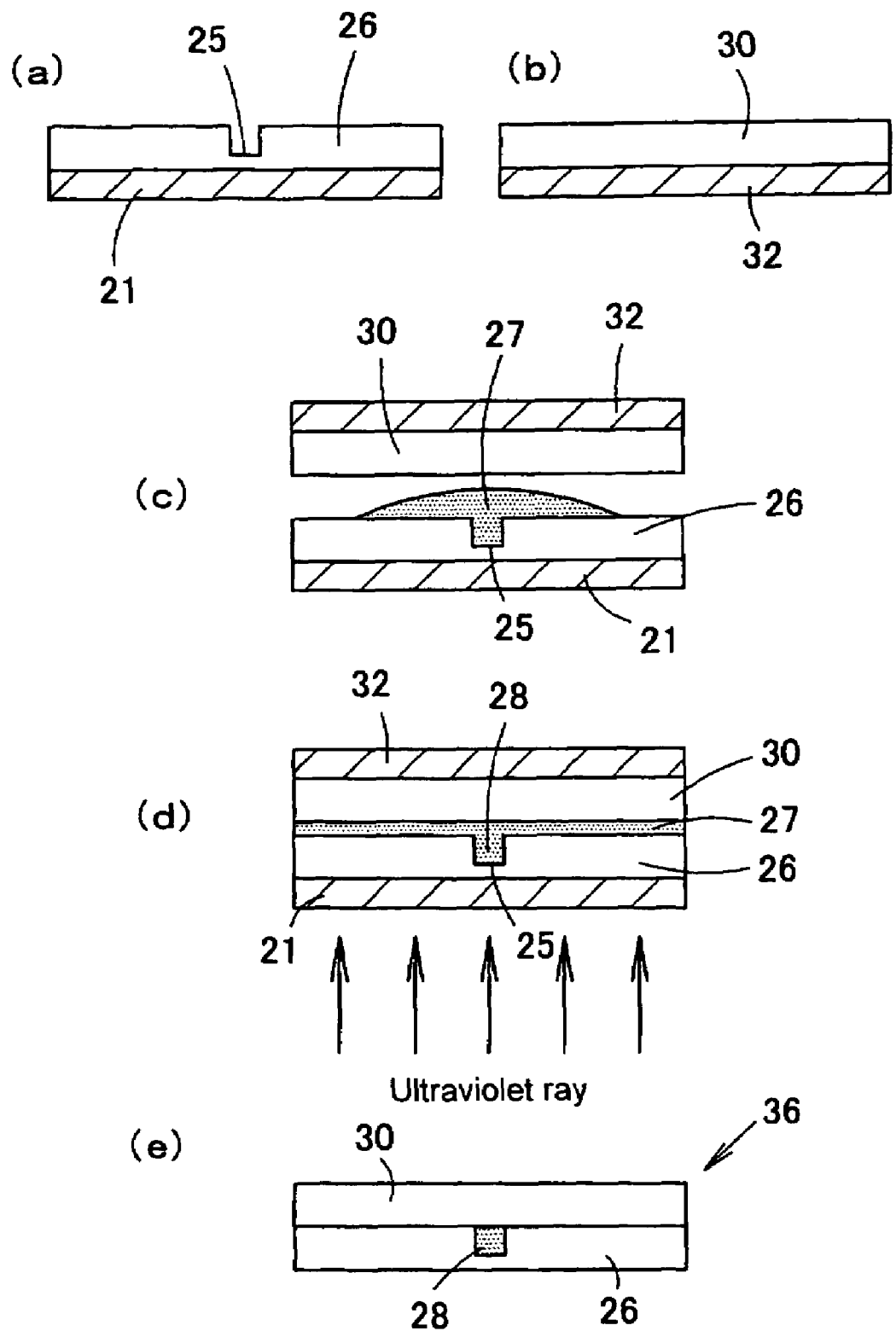
FIGS. 7(a) to 7(e) are schematic cross sectional views describing the steps for manufacturing the film waveguide by stacking a lower clad layer formed on the substrate and an upper clad layer formed on a different substrate in Embodiment 3 of the present invention.

FIG. 7 is a view describing the method of manufacturing a film waveguide according to Embodiment 3 of the present invention. The lower clad layer 26 shown in FIG. 7(*a*) is the lower clad layer 26 formed on the substrate 21 through steps same as in FIG. 2(*a*) to FIG. 2(*d*) of Embodiment 1, and the concave groove 25 is formed on the upper surface thereof. The upper clad layer 30 shown in FIG. 7(*b*) is the upper clad layer 30 formed on the substrate 32 through steps similar to FIGS. 5(*a*) to 5(*d*) of Embodiment 2.

In Embodiment 3, the core material 27 is applied to the region of the concave groove 25 on the upper surface of the lower clad layer 26 of FIG. 7(*a*), as shown in FIG. 7(*c*). The core material 27 is monomer or oligomer, which is precursors of the polymer having a refraction index higher than the lower clad layer 26 and the upper clad layer 30, and is an ultraviolet curable resin. The upper clad layer 30 is then turned upside down with the substrate 32 and superimposed on the core material 27 thereby sandwiching the core material 27 between the lower clad layer 26 and the upper clad layer 30 and filling the core material 27 in the concave groove 25 and thinly spreading the core material 27 entirely between the upper and lower clad layers 30, 26.

Thereafter, ultraviolet energy is irradiated onto the core material 27 through the substrate 21 or 32 to cure the core material 27, thereby forming the core 28 in the concave groove 25 with the core material 27 and joining the upper clad layer 30 and the lower clad layer 26, as shown in FIG. 7(*d*). Finally, the substrates 32, 21 on the front and the back are stripped from the upper clad layer 30 and the lower clad layer 26, respectively, to obtain a film, thereby obtaining the film waveguide 36 shown in FIG. 7(*e*).

According to Embodiment 3, since the molding of the core 28 by the core material 27 and the joining task of the upper clad layer 30 and the lower clad layer 26 by the core material 27 are performed all at once, the manufacturing steps of the film waveguide 36 can be reduced. Therefore, according to Embodiment 3, the manufacturing steps of the film waveguide 36 can be rationalized.

Figure 8:
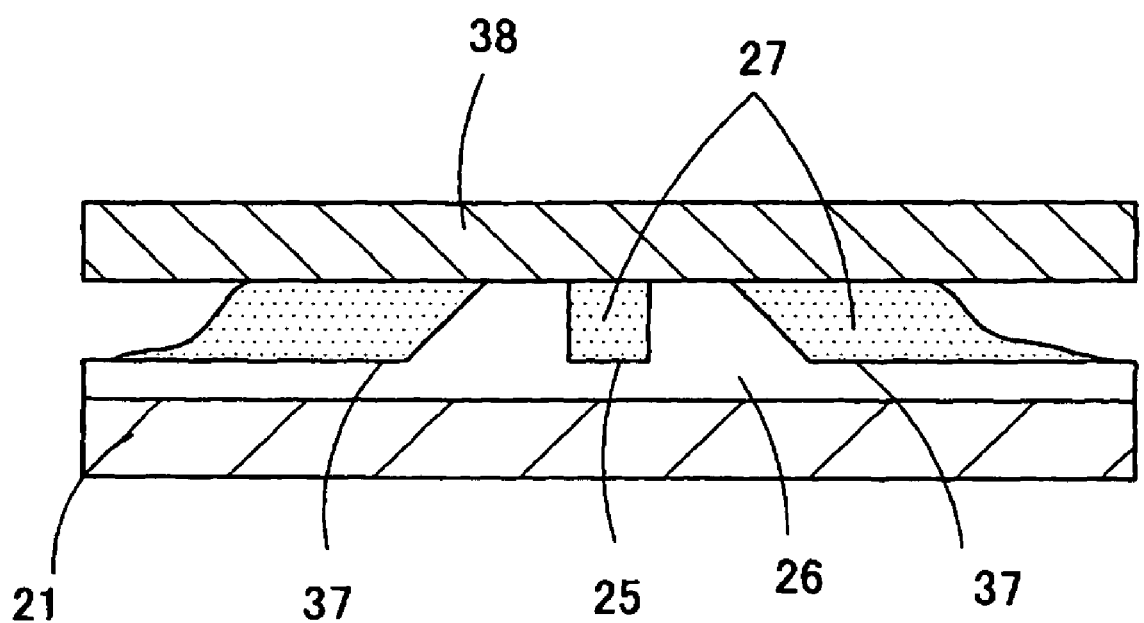
FIG. 8 is a schematic cross sectional view describing a variant of the present invention.

In Embodiments 1 to 3, a depression 37 for allowing the escaping of core material 27 may be arranged on at least one side of the concave groove 25 formed in the lower clad layer 26, as shown in FIG. 8. When pressing the core material 27 with the stamper 38 or the upper clad layer 30 and molding the core 28 in the concave groove 25 after supplying the core material 27 into the concave groove 25 of the lower clad layer 26, the excessive core material 27 in the concave groove 25 is pushed out from the concave groove 25. In this case, if the core material 27 that has been pushed out becomes a thick resin film between the upper surface of the lower clad layer 26 and the stamper 38 etc., the optical signal in the core 28 leaks through such resin film, thereby lowering the reliability of the film waveguide.

If the depression 37 is formed in the vicinity of the concave groove 25, as shown in FIG. 8, the excessive core material 27 is rapidly pushed out from the concave groove 25 and escapes to the depression 37, and thus the resin film between the upper surface of the lower clad layer 26 and the stamper 38 can be sufficiently thinned by pressurization over a short period of time and the reliability of the film waveguide can be enhanced.

The region to arrange the depression for escaping the core material is not limited to the upper surface of the lower clad layer 26, and may be arranged in the stamper 38 or the upper clad layer.

If the modified acrylate resin containing hydrogen bonding group such as hydroxy group, carboxyl group, carbonyl group, amino group, and imino group is used for the upper clad layer 30 or the core 28 which interface contacts the lower clad layer 26 formed by elastomer in each embodiment, the adhesive force of the interface contacting the lower clad layer 26 can be enhanced. Similarly, if the resin containing hydrogen bonding group such as hydroxy group, carboxyl group, carbonyl group, amino group, and imino group is used for the lower clad layer 26 or the core 28 which interface contacts the upper clad layer 30 formed by elastomer, the adhesive force of the interface contacting the upper clad layer 30 can be enhanced.

EMBODIMENT 4

Figure 9:
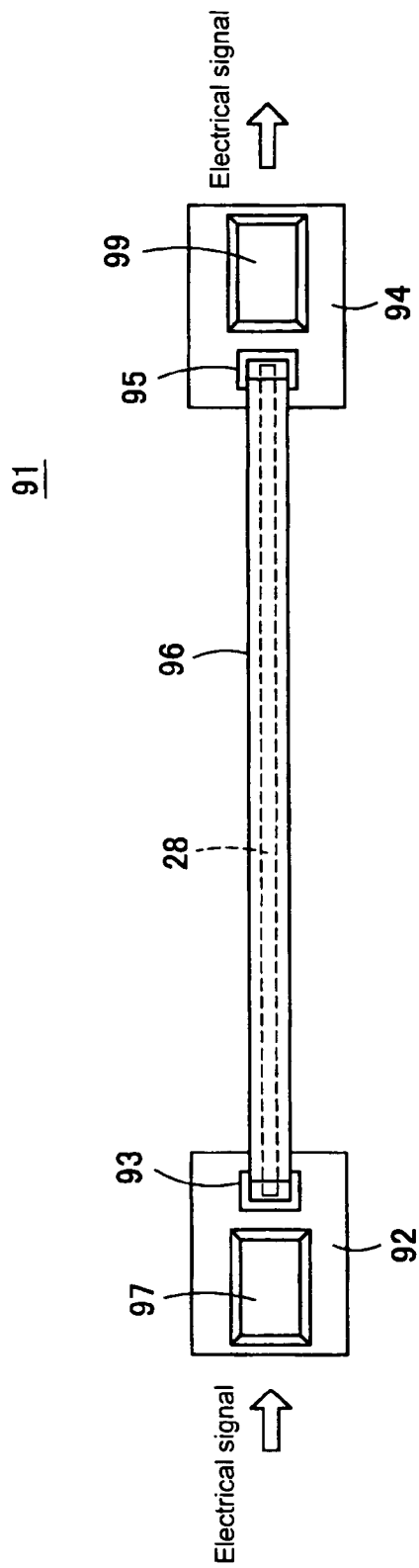
FIG. 9 is a plan view showing a film waveguide module for one-way communication according to Embodiment 4 of the present invention.
Figure 10:
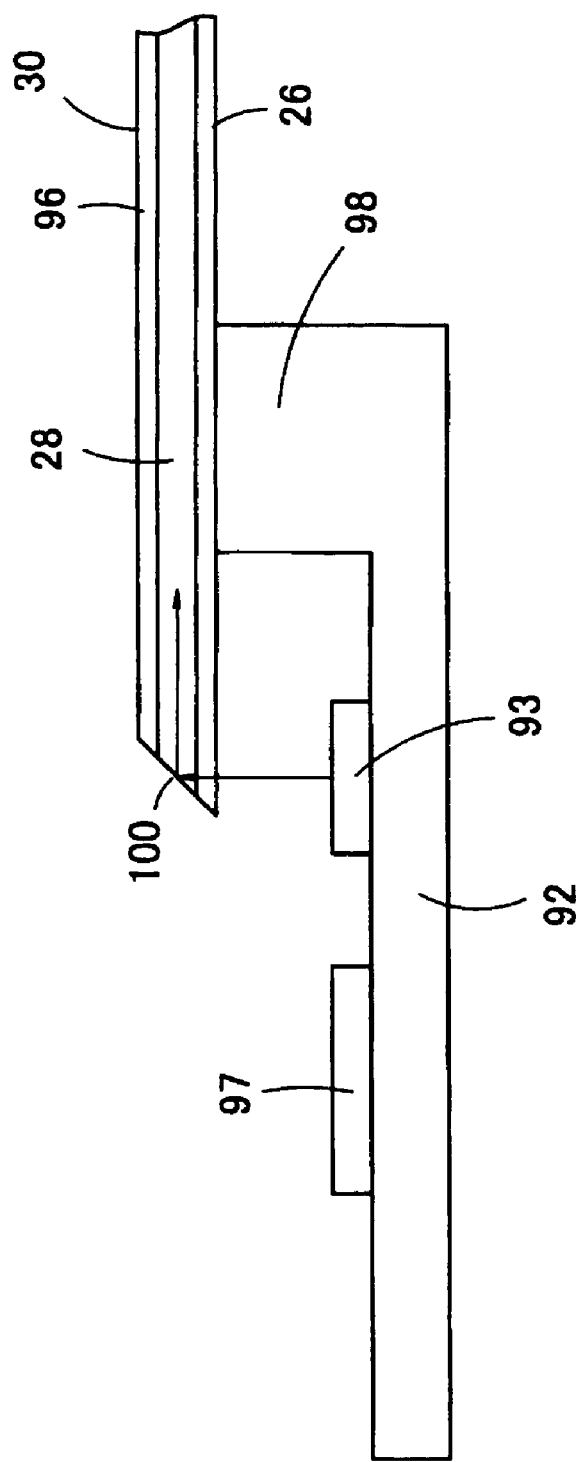
FIG. 10 is a schematic cross sectional view showing one section of the film waveguide module shown in FIG. 9 in an enlarged manner.

FIG. 9 is a plan view showing a film waveguide module for a one-way communication according to Embodiment 4 of the present invention, and FIG. 10 is a schematic cross sectional view showing one section of FIG. 9 in an enlarged manner. A film waveguide module 91 is obtained by connecting both wiring substrates 92, 94 with the film waveguide 96 by connecting both ends of the film waveguide 96 according to the present invention to a light projecting element 93 mounted on one wiring substrate 92 and to a light receiving element 95 mounted no another wiring substrate 94.

A driving IC 97 and the light projecting element 93 of area light emitting type such as VCSEL are mounted on the wiring substrate 92 on the transmission side. The light emitting direction of the light projecting element 93 is a direction substantially perpendicular to the upper surface of the wiring substrate 92. One end of the film waveguide 96 is cut to an angle of 45° as shown in FIG. 10, and the film waveguide is fixed on a supporting platform 98 so that the relevant end of the film waveguide 96 is parallel to the wiring substrate 92 and the surface 100 cut to 45° is facing diagonally upward. Furthermore, the surface 100 cut to 45° of the core 28 is positioned on an optical axis of the light ray emitted from the light projecting element 93.

An amplifying IC 99 and the light receiving element 95 are mounted on the wiring substrate 94 on the reception side 94. The other end of the film waveguide is also cut to an angle of 45°, and the film waveguide is fixed on a supporting platform (not shown) so that the relevant end of the film waveguide 96 is parallel to the wiring substrate 94 and the surface cut to 45° is facing diagonally upward. The light receiving element 95 is positioned immediately below the surface cut to 45° of the core 28.

Therefore, when the electrical signal input to the driving IC 97 is converted to an optical signal (converted light) and the optical signal is emitted from the light projecting element 93, the light emitted from the light projecting element 93 enters the core 28 from the lower surface of the film waveguide 96. The optical signal that has entered the core 28 is totally reflected at the surface cut to 45° of the core 28 so that the advancing direction is bent to a direction substantially parallel to the length direction of the core 28, and coupled to the core 28.

The optical signal coupled to one end of the film waveguide 96 then propagates through the core 28, and reaches the other end of the film waveguide 96. The light that has reached the other end of the film waveguide 96 is totally reflected at the surface cut to 45° of the core 28, emitted downwardly from the other end of the film waveguide 96 and received by the light receiving element 95. The optical signal light received at the light receiving element 95 is converted to the electrical signal, which electrical signal is amplified in the amplifying IC 99 and then output to the outside from the wiring substrate 94.

In such film waveguide module 91, the wiring substrate 92 and the wiring substrate 94 are not necessarily arranged in the same plane, and the optical signal can be transmitted from the wiring substrate 92 side to the wiring substrate 94 side even if the wiring substrates 92 and 94 are arranged in an arbitrary plane since the film waveguide 96 can be flexibly bent.

Figure 11:
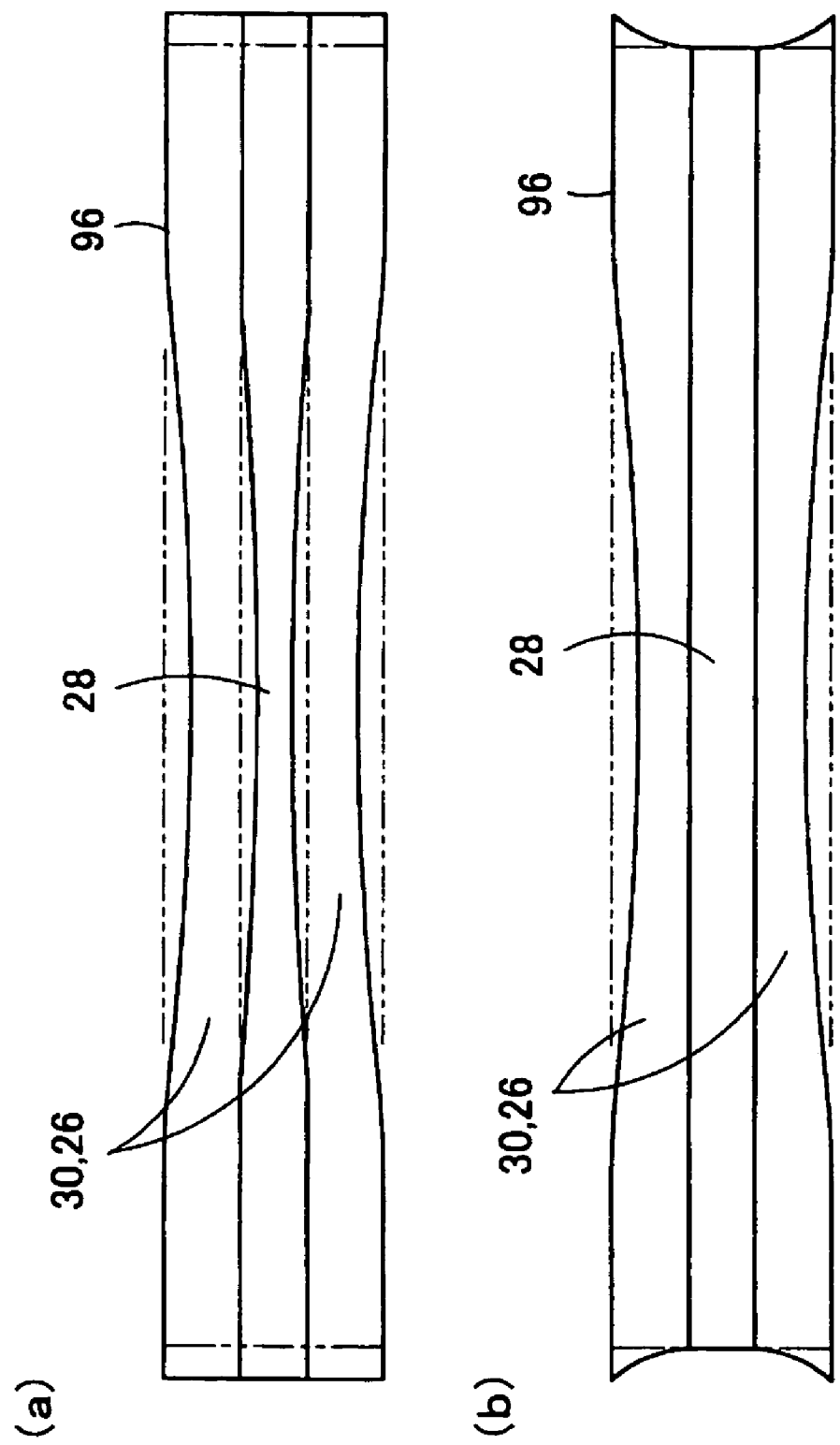
FIG. 11(a) is a view showing a film waveguide in which the core is deformed by tensile force in a frame format form.
FIG. 11(b) is a view showing a film waveguide in which the deformation of the core by tensile force is reduced in a frame format form.

However, a mechanical tensile force is sometimes applied to the film waveguide 96 when the wiring substrates 92 and 94 connected by way of the film waveguide 96 are separately arranged. Since the flexural modulus of the upper and lower clad layers 30, 26 is small or smaller than or equal to 1,000 MPa in the film waveguide module 91 of the present invention, the film waveguide module 91 can be stretched by simply applying small tensile force thereby narrowing the width of the film waveguide module 91, as shown in FIG. 11(a). If the flexural modulus of the core 28 and the flexural modulus of the upper and lower clad layers 30, 26 are the same, the core 28 similarly stretches and the core diameter thereof becomes narrower, or the cross section of the core deforms thereby changing the mode of the optical signal propagated through the core 28 and deteriorating the transmission property of the optical signal.

Therefore, the flexural modulus of the core 28 is made greater than the flexural modulus of the upper and lower clad layers 30, 26 in the film waveguide module 91. That is, the flexural modulus of the upper and lower clad layers 30, 26 is made to be smaller than or equal to 1,000 MPa, and the flexural modulus of the core 28 is made to be greater than the flexural modulus of the upper and lower clad layers 30, 26. As a result, the rigidity of the upper and lower clad layers 30, 26 becomes lower than the core 28, and furthermore, as the core 28 is not directly fixed to the wiring substrates 92, 94, the tensile force is absorbed by the upper and lower clad layers 30, 26 as shown in FIG. 11(b) even if a mechanical tensile force etc. is applied to the film waveguide 96. The deformation of the core 28 is thereby reduced, and the deterioration of the transmission property of the film waveguide 96 is suppressed.

Moreover, the transmission property of the film waveguide 96 deteriorates due to the core diameter or the cross sectional shape of the core when the film waveguide 96 is twisted, which aspect will be hereinafter described in relation to portable telephones.

Figure 12:
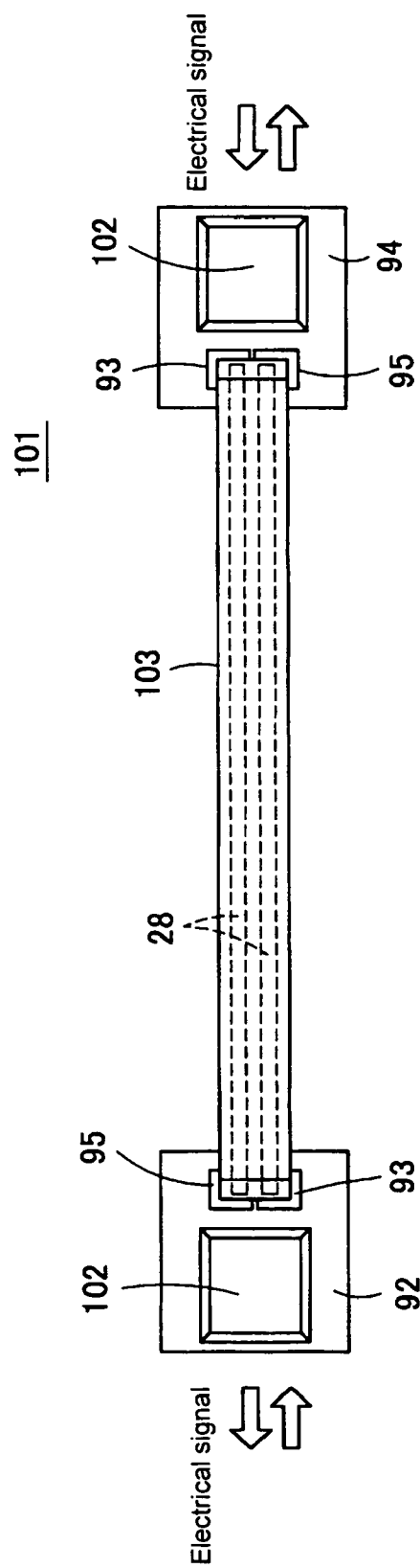
FIG. 12 is a plan view showing a film waveguide module for two-way communication according to Embodiment 4 of the present invention.

The film waveguide module 91 for one-way communication has been described in the above embodiment, but may be a film waveguide module of two-way communication. For example, the film waveguide module 101 for two-way communication shown in FIG. 12 has both wiring substrates 92, 94 respectively mounted with the driving and amplifying IC 102 having the functions of the driving IC and the amplification IC, the light projecting element 93 and the light receiving element 95. The light projecting element 93 of the wiring substrate 92 and the light receiving element 95 of the wiring substrate 94 are connected with one core 28, and the light projecting element 93 of the wiring substrate 94 and the light receiving element 95 of the wiring substrate 92 are connected with the other core using the two-core film waveguide 103 as the film waveguide. According to such film light waveguide module 101, the electrical signal input to one wiring substrate 92 or 94 is propagated as the optical signal via the film waveguide module 101, and is restored to and output as the electrical signal from the other wiring substrate 94 or 92.

The film waveguide module in which the light emitting element and the light receiving element are connected by way of the film waveguide has been described in the above embodiment, but the circuit substrates may be connected by connecting both ends to an optical connector mounted on the circuit substrate.

EMBODIMENT 5

Figure 13:
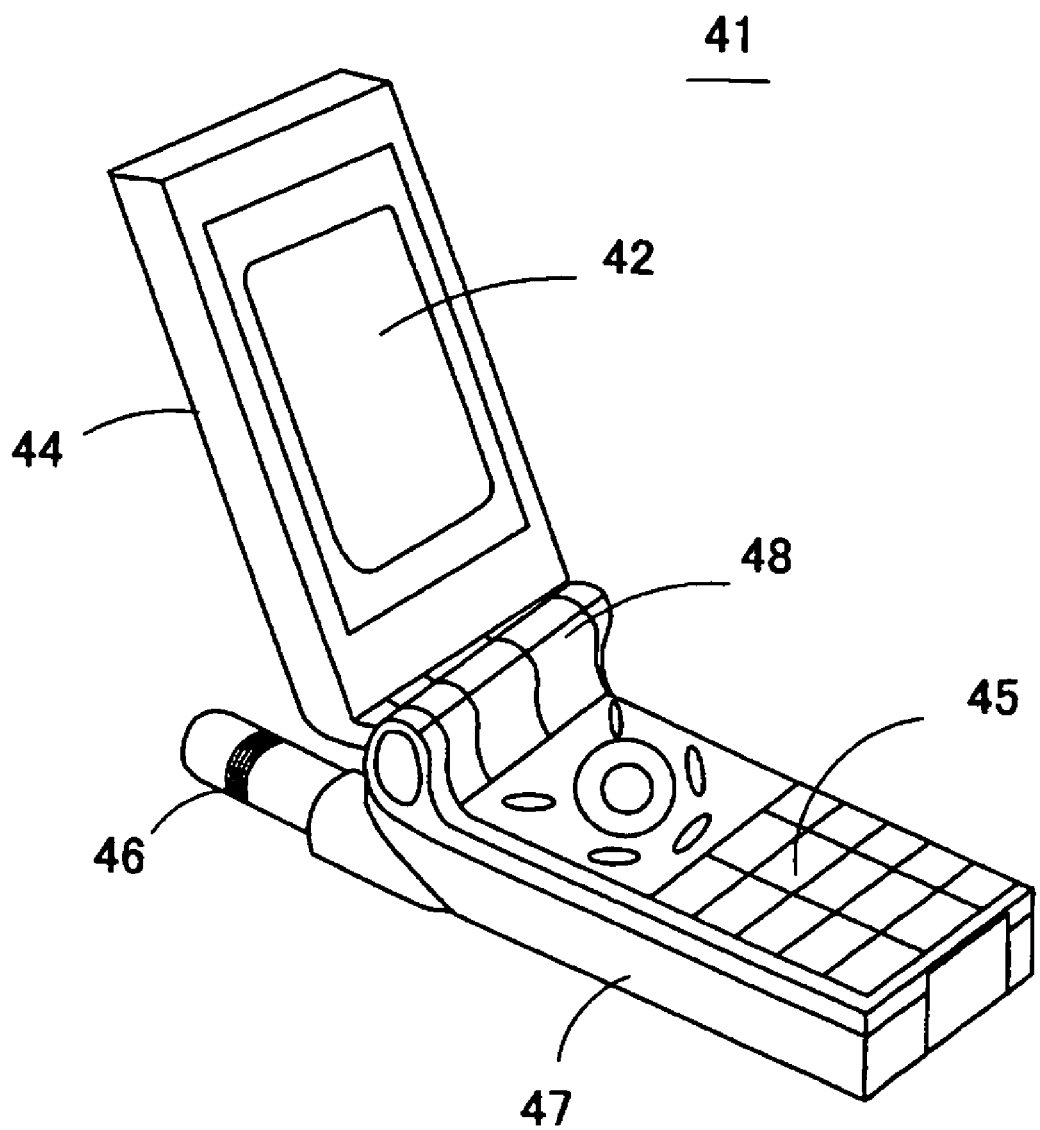
FIG. 13 is a perspective view of a portable telephone, which is Embodiment 5 of the present invention.
Figure 14:
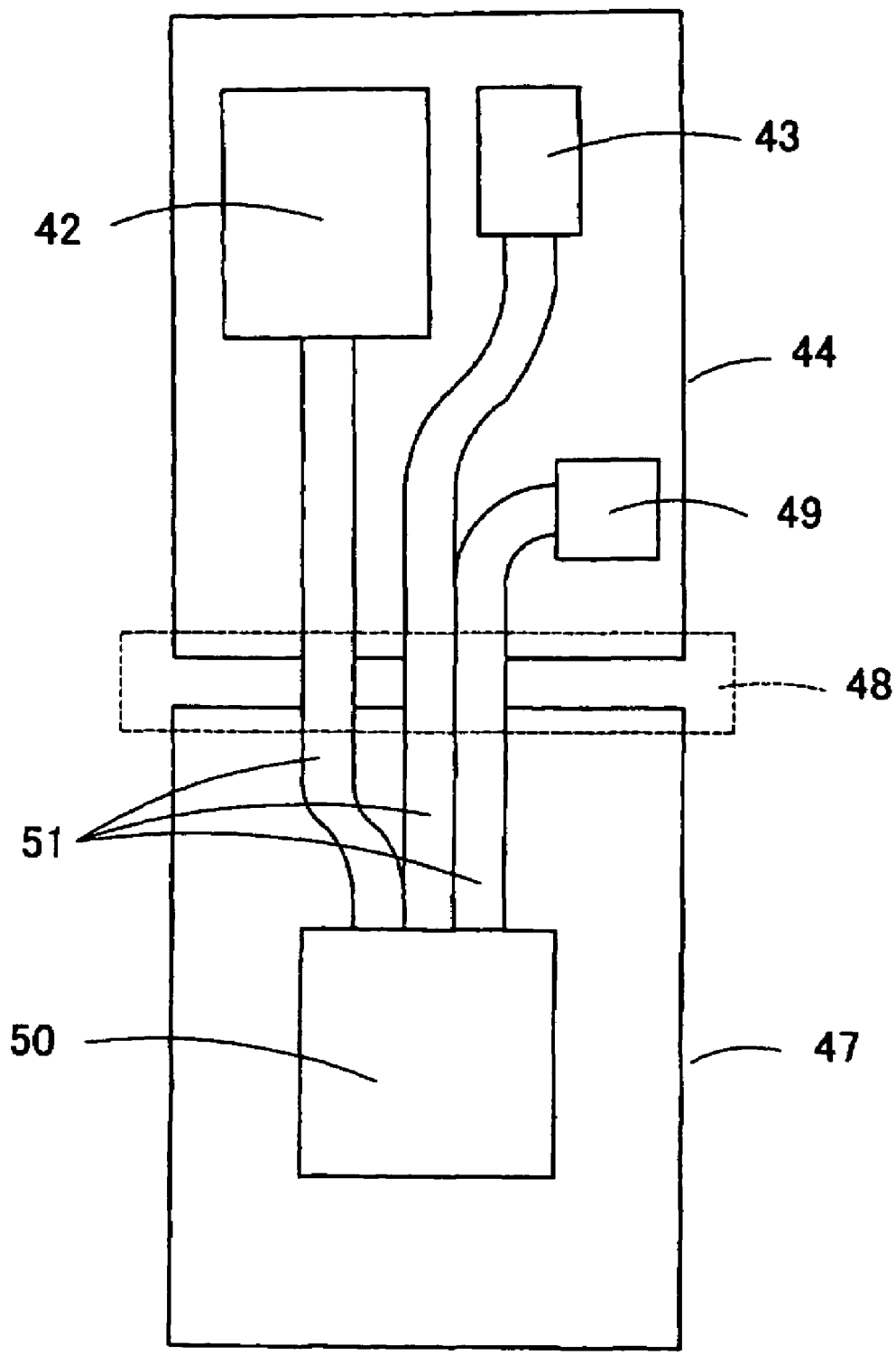
FIG. 14 is a schematic view showing a circuit configuration of the portable telephone.

An application (Embodiment 5) using the film waveguide according to the present invention will now be described. The film waveguide 51 used below is not limited to the film waveguide including one core as described hereinabove, and may be film waveguides in which a plurality of cores are wired in parallel, film waveguides in which the core is branched, etc. FIG. 13 is a perspective view showing a foldable portable telephone 41 that can be folded in half, and FIG. 14 is a schematic configuration diagram thereof. The portable telephone 41 has a configuration in which a display part 44 including a liquid crystal display panel 42 and a digital camera 43, and an operation part 47 including, for instance, a ten-key key panel 45 and an antenna 46 are coupled in a freely rotating manner by a hinge part 48. The digital camera 43 is arranged on the back surface side of the liquid crystal display panel 42. An external memory 49 is mounted in the display part 44, and an integrated circuit (LSI) 50 for executing the communication function or accepting the input from the key panel 45 and executing various functions is mounted on the operation part 47.

Therefore, the signal must be transmitted and received between the integrated circuit 50 in the operation part 47, and the liquid crystal display panel 42 and the digital camera 43 in the display part 44 and the display part 44. In the portable telephone 41 of Embodiment 5, the film waveguide 51 according to the present invention is used to connect the operation part 47 side and the display part 44 side, as shown in FIG. 13. That is, the integrated circuit 50 in the operation part 47, and the liquid crystal display panel 42, the digital camera 43 and the external memory 49 in the display part 44 are connected by way of the film waveguide 51 to allow transmission and reception of the optical signal.

Figure 15:
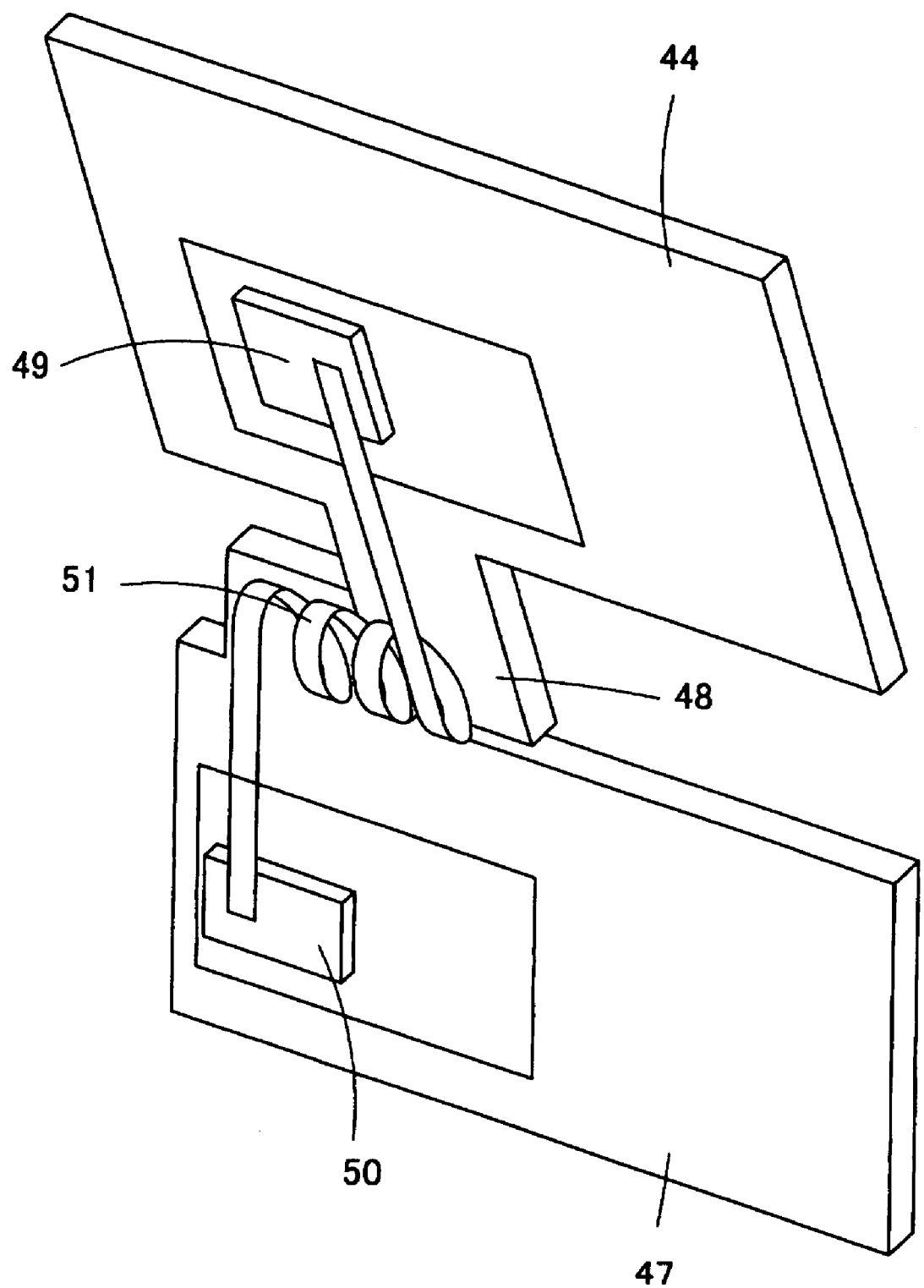
FIG. 15 is a perspective view showing a state in which the display part side and the operation part side of the portable telephone are connected by means of the film waveguide in a frame format form.

The film waveguide 51 must pass through the hinge part 48 in order to realize such configuration. In Embodiment 5, the configuration in which the film waveguide 51 is bent in a spiral form at the hinge part 48 is used for the configuration, as shown in FIG. 15. In order to manufacture film waveguide 51, the flat film waveguide 51 is winded to a supporting rod etc. to give it a retainable winding shape after the flat film waveguide 51 is manufactured. The film waveguide 51 according to the present invention can be bent to have a small curvature radius, and thus the film waveguide 51 will not be damaged even when formed into the spiral form.

According to Embodiment 5, high speed and large volume communication can be realized in a limited space in the portable telephone 41. Since the film waveguide 51 of the present invention has high flexural performance, the film waveguide 51 is less likely to be damaged even when the portable telephone 41 is repeatedly opened and closed. Furthermore, since the film waveguide 51 is formed into a spiral form at the hinge part 48, a large load is less likely to be applied to the film waveguide 51 at the hinge part 48 even if the portable telephone 41 is opened and closed, and the durability of the film waveguide 51 is further enhanced.

The portable telephone 41 is not limited to that in which the display part 44 and the operation part 47 are folded in half, and may be that in which the display part 44 is rotated in a plane parallel to the operation part 47 and folded.

Figure 16:
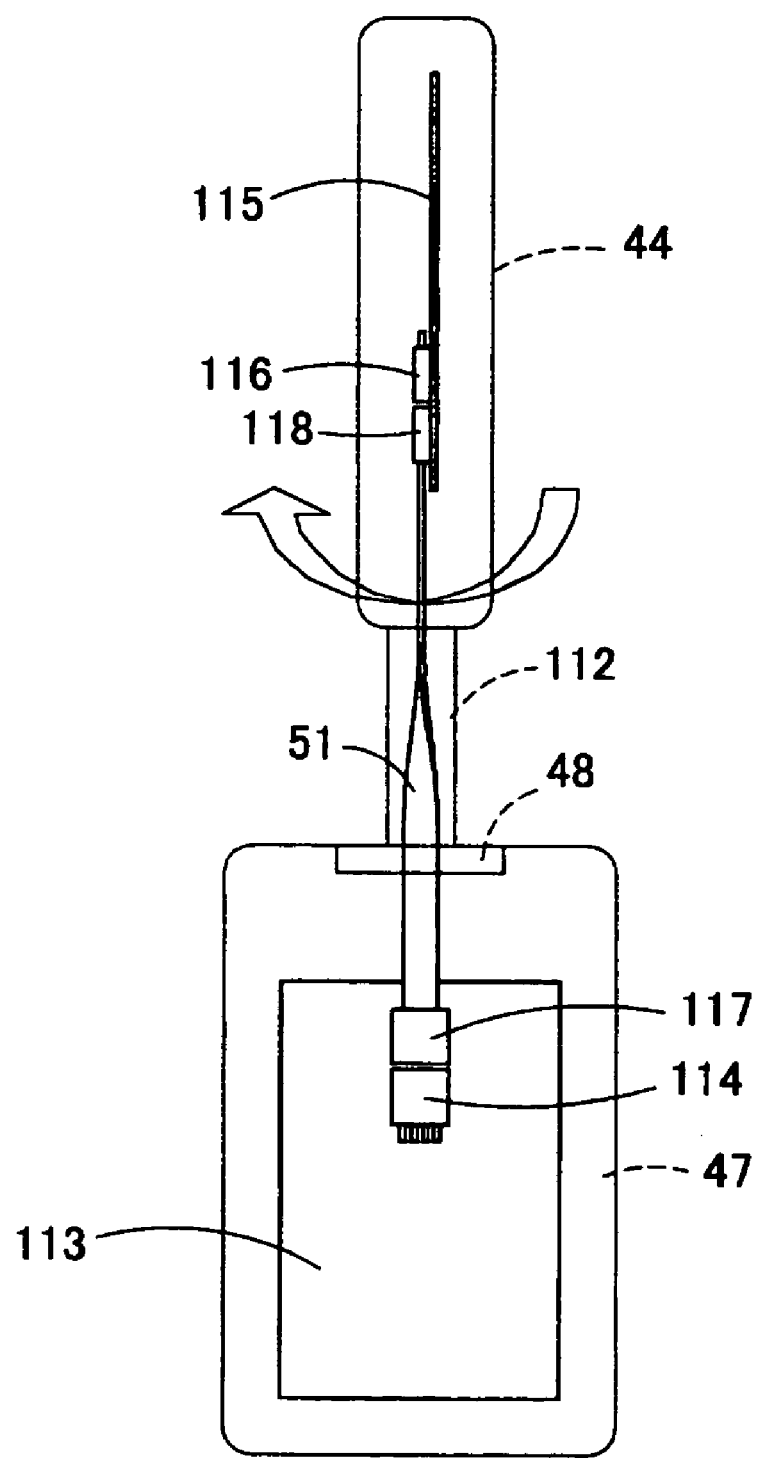
FIG. 16 is a perspective view showing a configuration of a different portable telephone according to Embodiment 5 of the present invention.

FIG. 16 shows a schematic view showing another example of the portable telephone 111. The portable telephone 111 is a biaxial rotation type portable telephone. That is, the display part 44 and the operation part 47 can be folded in half and opened at the hinge part 48. Furthermore, the display part 44 can be rotated about the axis line direction orthogonal to the axis direction of the hinge part 48 at a hinge part 112.

With regards to the inside of the portable telephone 111, an optical connector 114 is arranged in the wiring substrate 113 accommodated in the operation part 47, and an optical connector 116 is arranged in the wiring substrate 115 arranged in the display part 44. The optical connector 117 arranged at one end of the film waveguide 51 is coupled to the optical connector 114, the optical connector 118 arranged at the other end of the film waveguide 51 is coupled to the optical connector 116, and the wiring substrate 113 of the operation part 47 and the wiring substrate 115 of the display part 44 are connected through the film waveguide 51. The film waveguide 51 substantially linearly connects the wiring substrate 113 and the wiring substrate 115 when the display part 44 and the operation part 47 are in the opened state.

In such portable telephone 111, the film waveguide 51 curves and bends when the display part 44 and the operation part 47 are folded in half, and the film waveguide 51 twists when the display part 44 is rotated by the hinge part 112. The film waveguide 51 is easily bent or twisted with a small external force since the flexural modulus of the upper and lower clad layers 30, 26 of the film waveguide 51 is smaller than or equal to 1,000 MPa.

Figure 17:
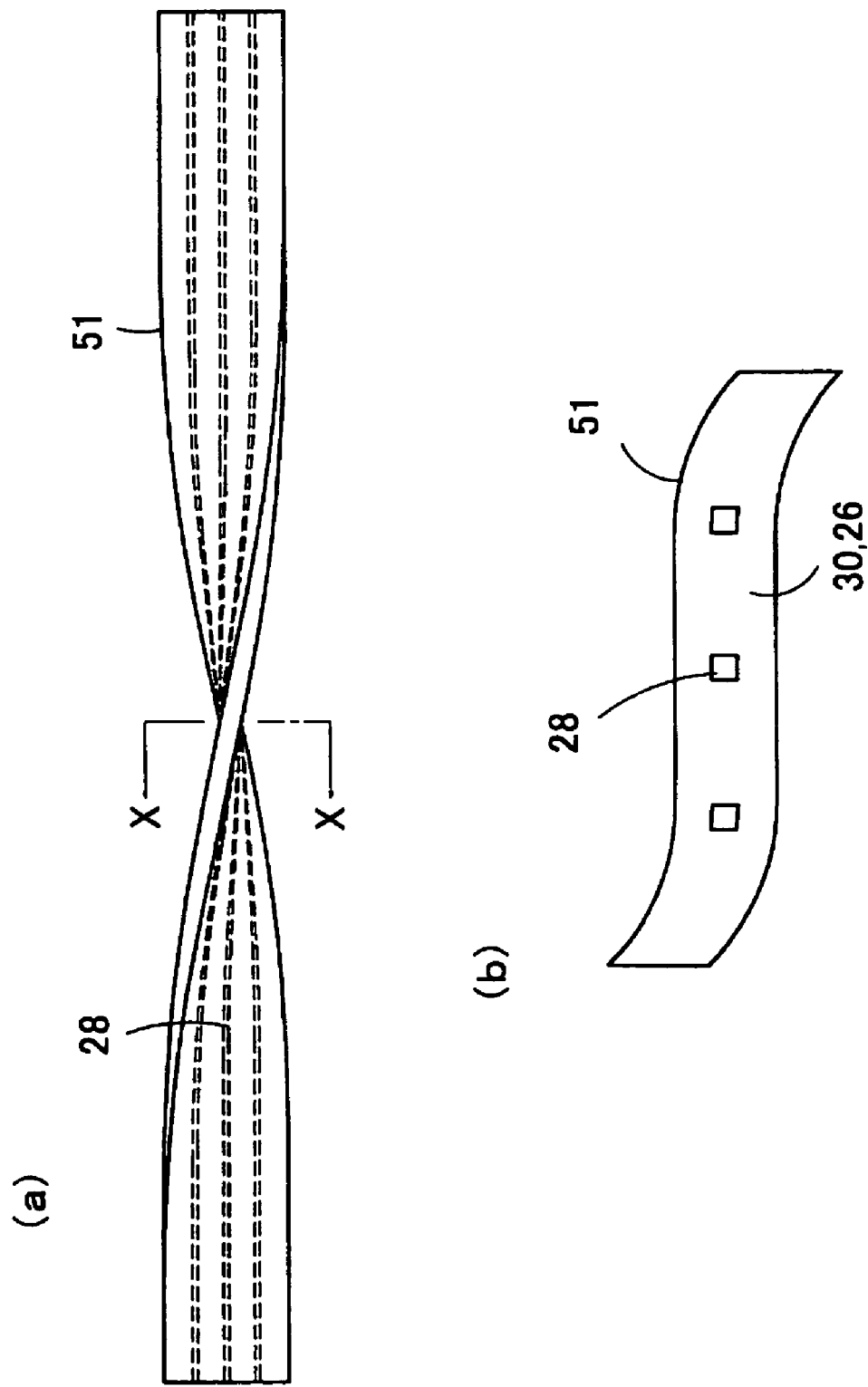
FIG. 17(a) is a view showing a state in which the film waveguide in the portable telephone is twisted.
FIG. 17(b) is a view showing a cross section taken along line X-X of FIG. 17(a) in an enlarged manner.

However, the core diameter or the shape of the core are less likely to change even if the film waveguide 51 is stretched or twisted and the transmission property of the film waveguide 51 is less likely to deteriorate since the flexural modulus of the core 28 is greater than the flexural modulus of the upper and lower clad layers 30, 26. That is, when the film waveguide 51 is twisted as in FIG. 17(a), the film waveguide 51 deforms as shown in FIG. 17(b), and the core 28 also deforms, whereby the transmission property of the film waveguide 51 may deteriorate. However, if the flexural modulus of the core 28 is greater than the flexural modulus of the upper and lower clad layers 30, 26, the shape of the core is less likely to change even if the film waveguide 51 is twisted, and thus the transmission property of the film waveguide 51 is less likely to deteriorate (deterioration of transmission property due to deformation etc. of the core shape when the film waveguide 51 is stretched is as described hereinabove).

Figure 18:
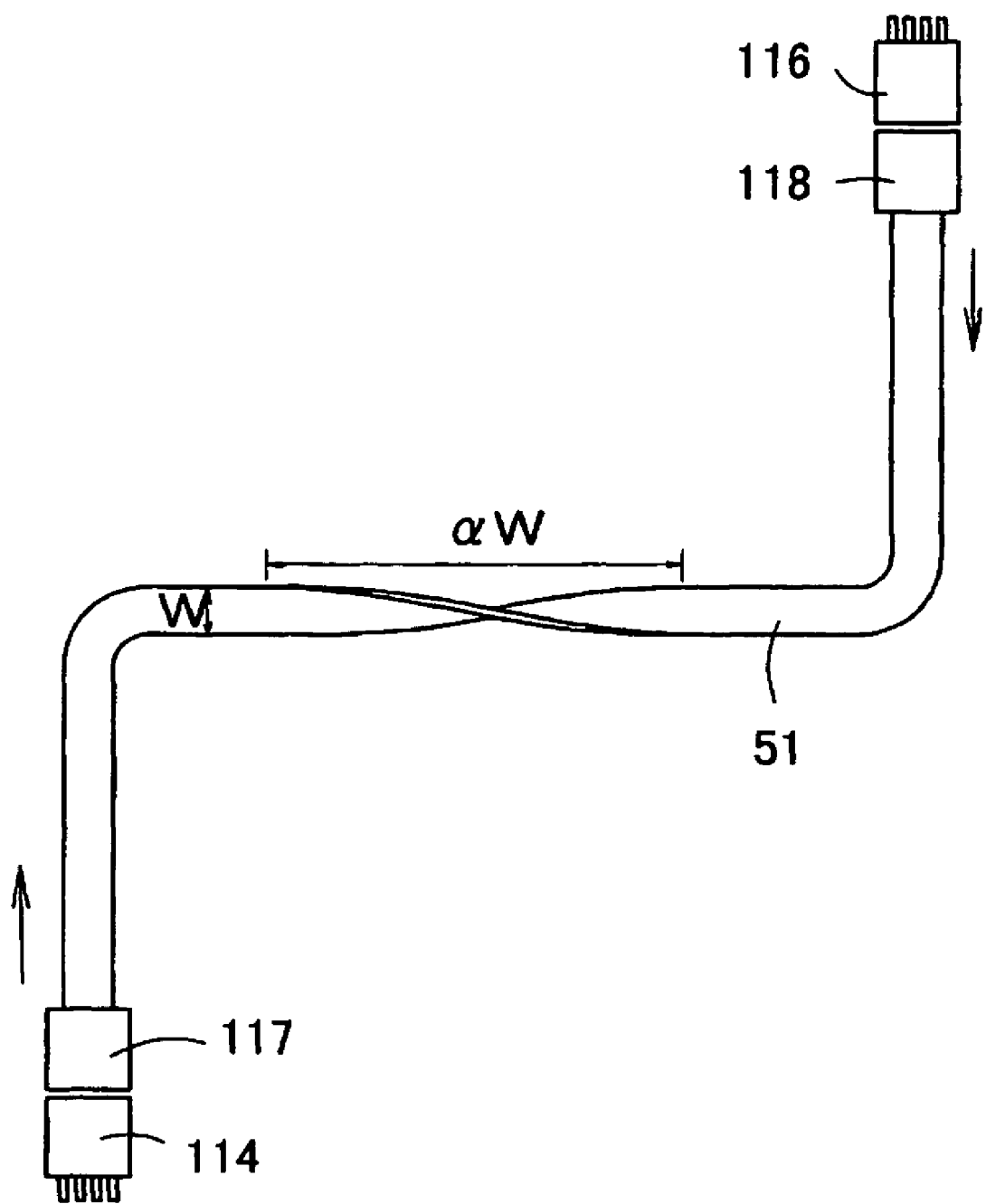
FIG. 18 is an explanatory view showing the length αW of the twisted region of the film waveguide.

Considering the film waveguide 51 twisted as shown in FIG. 18, where the width of the film waveguide 51 is assumed as W, and the length of the twisted portion out of the entire length of the film waveguide 51 as α×W. The value of α is desirably as small as possible in view of the wiring space in the portable telephone 111. However, if the value of α is smaller than substantially one, the shape of the twisted film waveguide 51 deforms, and the transmission property thereof tends to deteriorate. Therefore, it is desired to reduce the wiring space occupied by the film waveguide 51 so that the value of α approaches one as much as possible.

Figure 19:
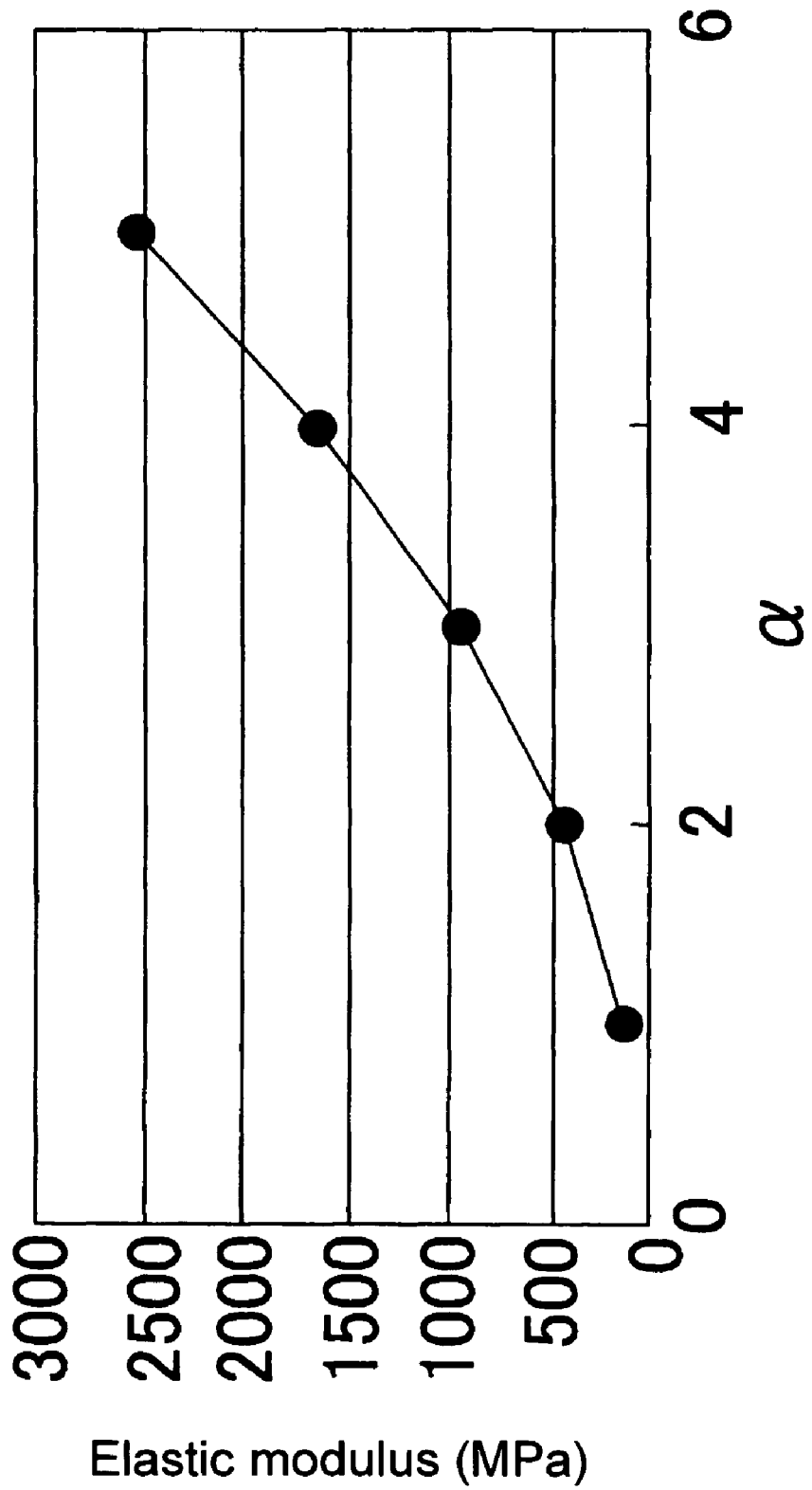
FIG. 19 is a view showing a relationship between the ratio α of the length of the twisted region with respect to the width of the film waveguide and the limit value of the required elastic modulus.

A relationship shown in FIG. 19 is established between the value of α and the limit value of the flexural modulus required for the upper and lower clad layers 30, 26. The flexural modulus of the upper and lower clad layers 30, 26 is made to smaller than or equal to substantially 250 MPa in order to have the value of α close to one.

On the other hand, the repulsive force of the twist increases if the value of α is small, whereby the connectors 117, 118 at both ends may be pulled and detach from the optical connector 114 of the wiring substrate 113 and the optical connector 116 of the wiring substrate 115, respectively. Normally, it is desired that the load of greater than or equal to 0.5 kgf is not applied in the optical connector etc., which is achieved to a satisfactory extent by having the flexural modulus of the film waveguide 51 to be smaller than or equal to 250 MPa. Therefore, the value of α can be brought close to 1 and reduced without causing connection failure of the optical connectors 117, 118 by having the flexural modulus of the upper and lower clad layers 30, 26 of the film waveguide 51 to be smaller than or equal to 250 MPa.

A method of forming an extra length part in the optical cable to reduce the stress by the twist of the optical cable may be used. However, if the extra length part is provided, a space for accommodating the extra length part is required at the hinge part, which enlarges the hinge part and inhibits miniaturization of the portable telephone. The hinge part 112 does not become thick even if the film waveguide 51 is twisted in the hinge part 112 by adopting the configuration of the portable telephone 111 etc.

Figure 20:
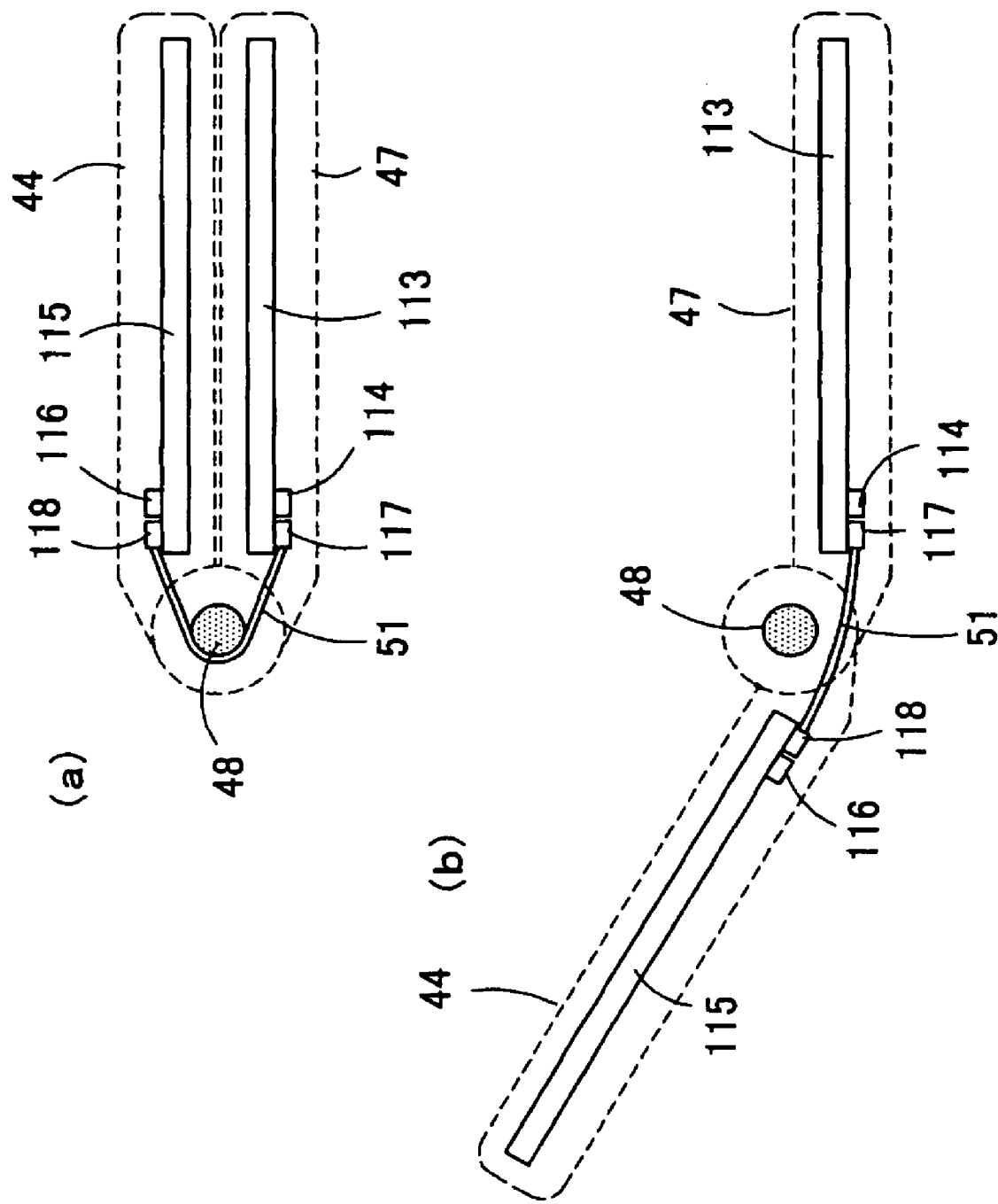
FIGS. 20(a) and 20(b) are schematic views showing the configuration of another further portable telephone according to Embodiment 5 of the present invention, where

The hinge part 48 can be made smaller as shown in FIG. 20(a) and FIG. 20(b) for the portable telephone in which the film waveguide 51 is not winded in a spiral form, and is not a biaxial rotation type. In such portable telephone, the film waveguide 51 is at its natural length without sagging when the display part 44 and the operation part 47 are in the opened state as shown in FIG. 20(b), but the tensile force is applied to the film waveguide 51 as the film waveguide 51 winds to the hinge part 48 when the display part 44 is folded as in FIG. 20(a). In such case as well, the deformation of the core 28 can be reduced, and the deterioration of the transmission property of the film waveguide 51 can be reduced as described in FIG. 11(a) and FIG. 11(b) by having the flexural modulus of the core 28 smaller than the flexural modulus of the upper and lower clad layers 30, 26.

EMBODIMENT 6

Figure 21:
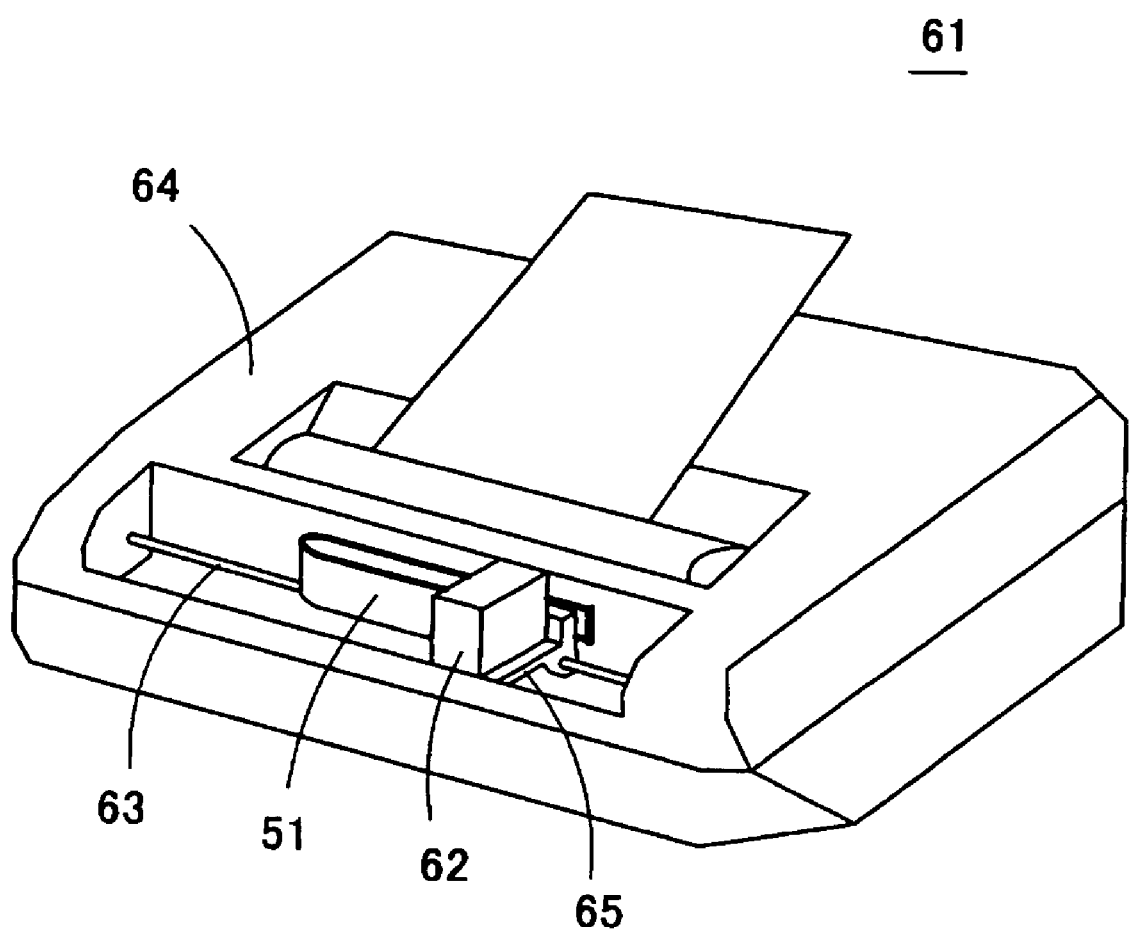
FIG. 21 is a perspective view of a printer, which is Embodiment 6 of the present invention.

FIG. 21 is a perspective view of a printer 61, which is Embodiment 6 of the present invention. In the ink jet type printer or a dot impact type printer, a printing head 62 is fixed on a supporting part 65, and the supporting part 65 travels to the left and the right along a guide bar 63. The printing information is sent from a printer main body 64 to the printing head 62.

Figure 22:
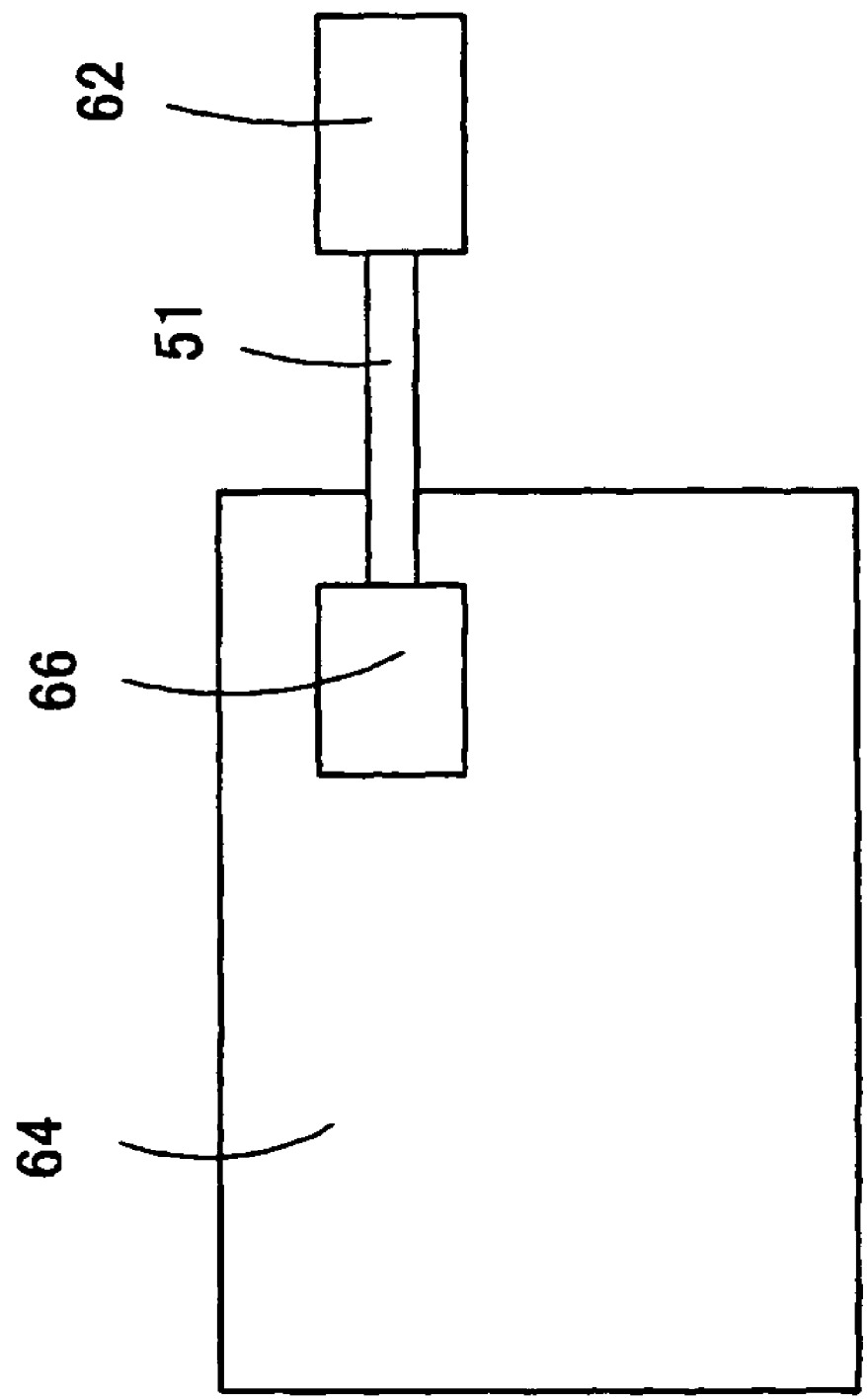
FIG. 22 is a schematic view showing a circuit configuration of the printer.

In Embodiment 6, a control section 66 in the printer main body 64 and the printing head 62 are connected by way of the film waveguide 51 according to the present invention, as shown in FIG. 22, to transmit the printing information from the printer main body 64 to the printing head 62. When the printing quality of the printer enhances and the dot density (dpi) increases, and further, the printing speed becomes faster and the amount of signal transmitted from the printer main body 64 to the printing head 62 also rapidly increases, large volume of signal can be transmitted at high speed to the printing head 62 by using the film waveguide 51.

Figure 23:
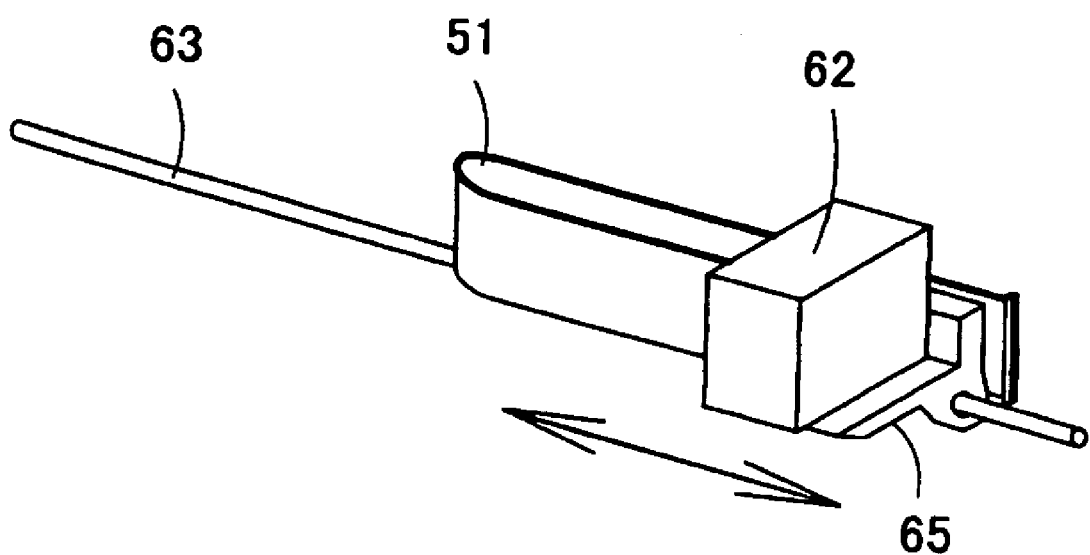
FIGS. 23(a) and 23(b) are perspective views showing a deforming state of the film waveguide when a printing head of the printer moves.
Figure 23:
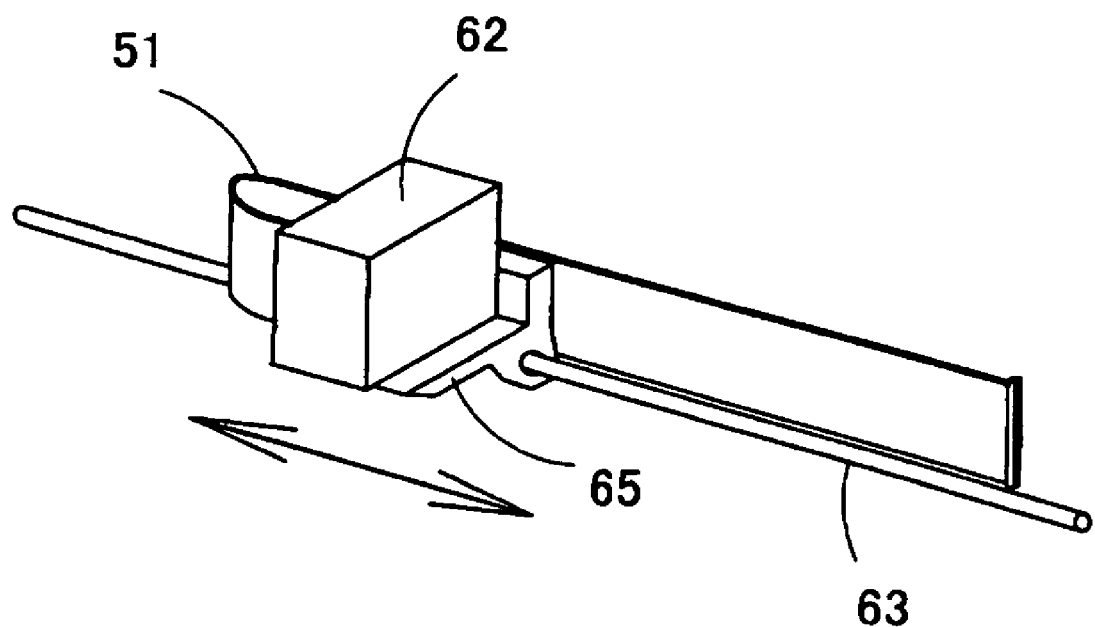

As shown in FIGS. 23(a) and 23(b), as the printing head 62 travels to the left and the right at high speed, the folded region of the film waveguide 51 moves therewith, and a large load applies, but the durability of the film waveguide 51 can be enhanced since the flexural performance is high in the film waveguide 51 of the present invention.

EMBODIMENT 7

Figure 24:
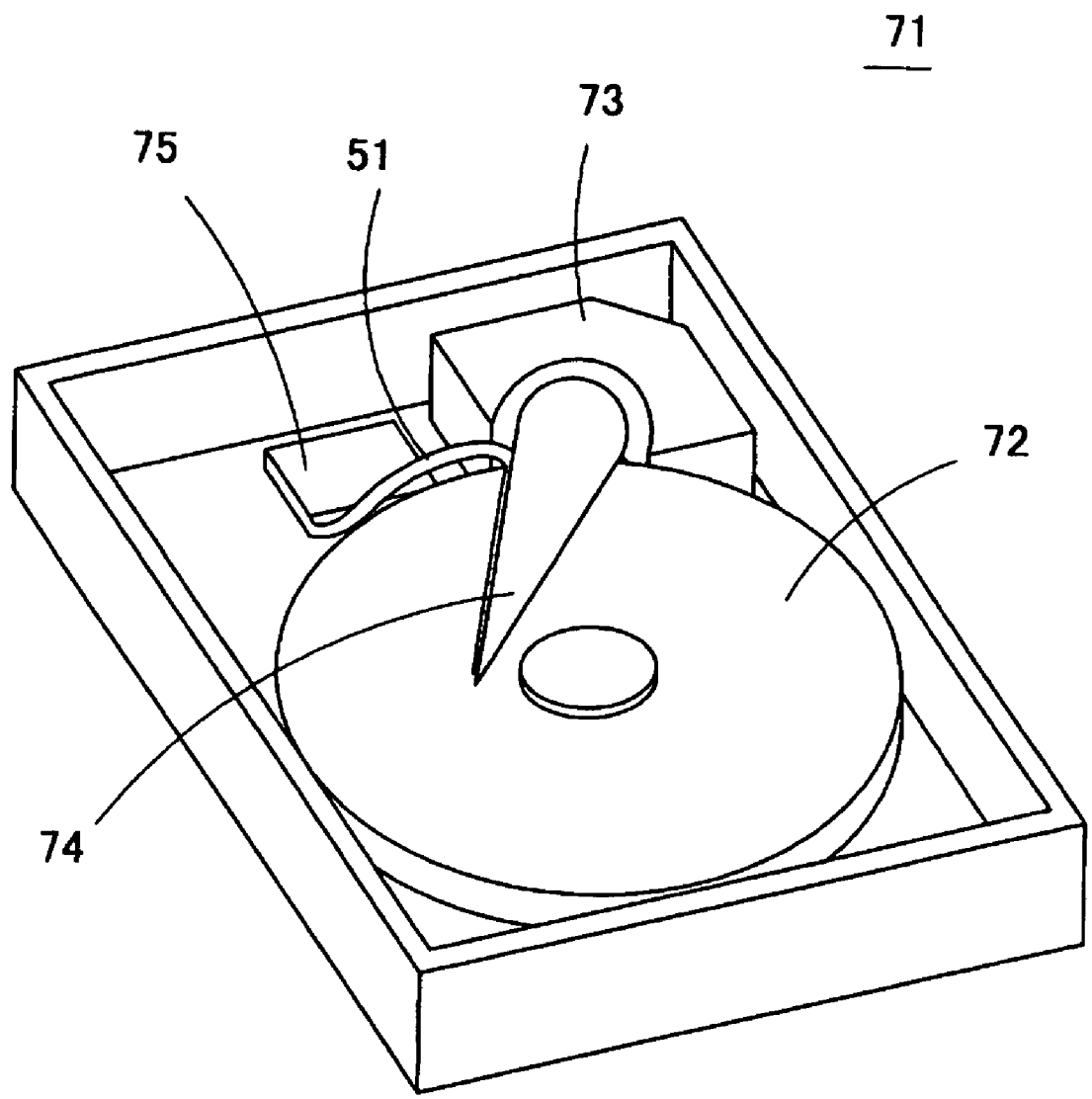
FIG. 24 is a perspective view of a hard disc drive, which is Embodiment 7 of the present invention.

FIG. 24 is a perspective view of a hard disc drive 71, which is Embodiment 7 of the present invention. In the hard disc drive 71, a data reading head driving unit 73 is arranged at the vicinity of the hard disc 72, and the distal end of a reading head 74 extended from the data reading head driving unit 73 faces the surface of the hard disc 72. One end of the film waveguide 51 is connected to the circuit substrate 75 mounted with the control circuit, and the other end of the film waveguide 51 is passed through the basal part of the reading head 74 and connected to the optical element at the distal end of the reading head 74. The film waveguide 51 has a function of transmitting data (optical signal) between the circuit substrate 75 and the reading head 74 when reading the data stored in the hard disc 72 or when writing data thereto.

The volume of the data to be stored in the hard disc drive 71 is becoming larger. However, there are limits with respect to the density of transmission with the flexible print substrate conventionally used as the data transmission path, and either the number of flexible print substrate is increased or the flexible print substrate is enlarged in order to be used for the data transmission path of the hard disc drive becoming of larger volume, which arises problems in flexural performance and size. However, the transmission path having bending property, and further, being compact and allowing large volume data transmission is realized using the film waveguide 51.

EMBODIMENT 8

Figure 25:
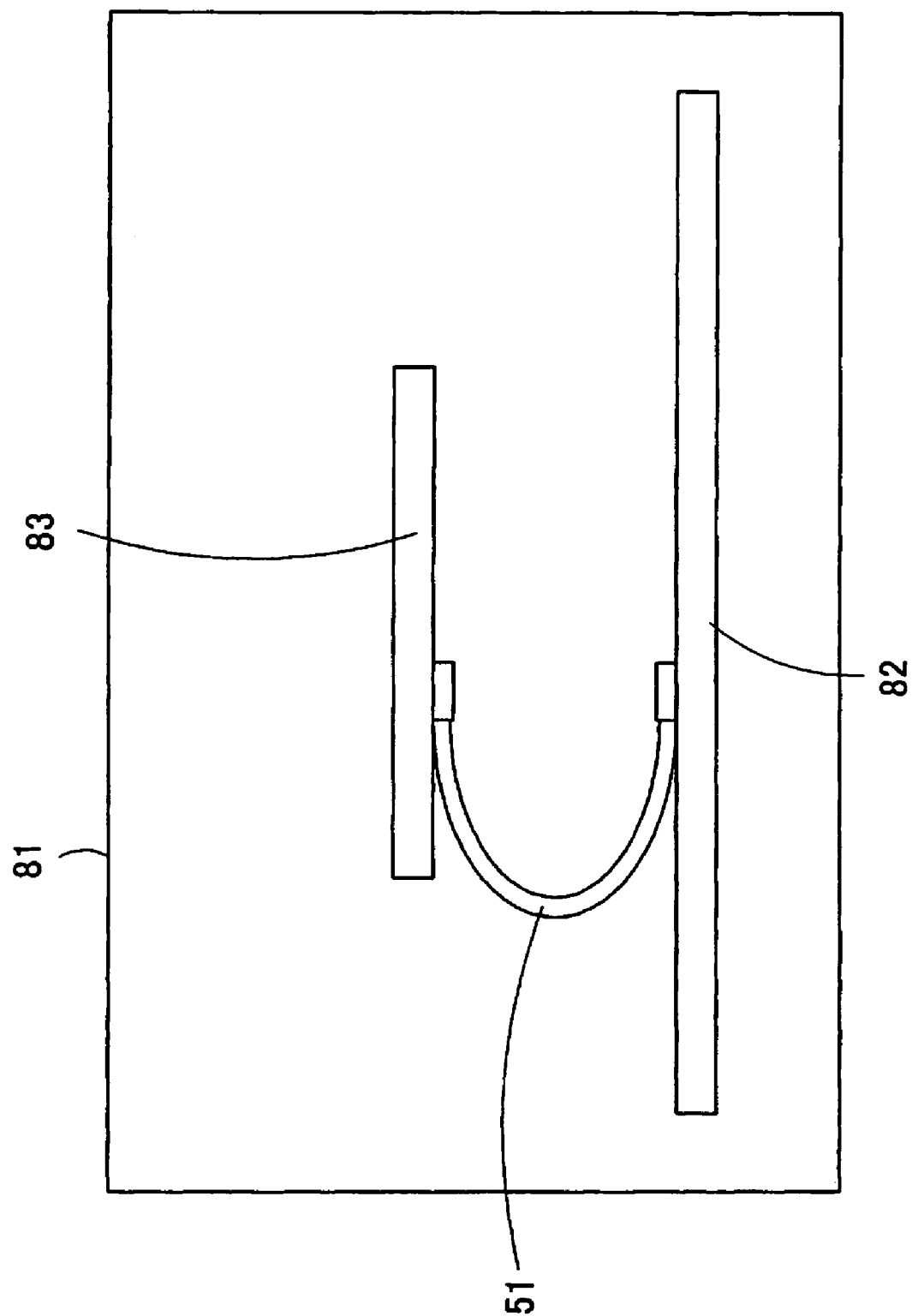
FIG. 25 is a view showing one example of a connecting mode of the film waveguide to an electronic circuit substrate.
Figure 26:
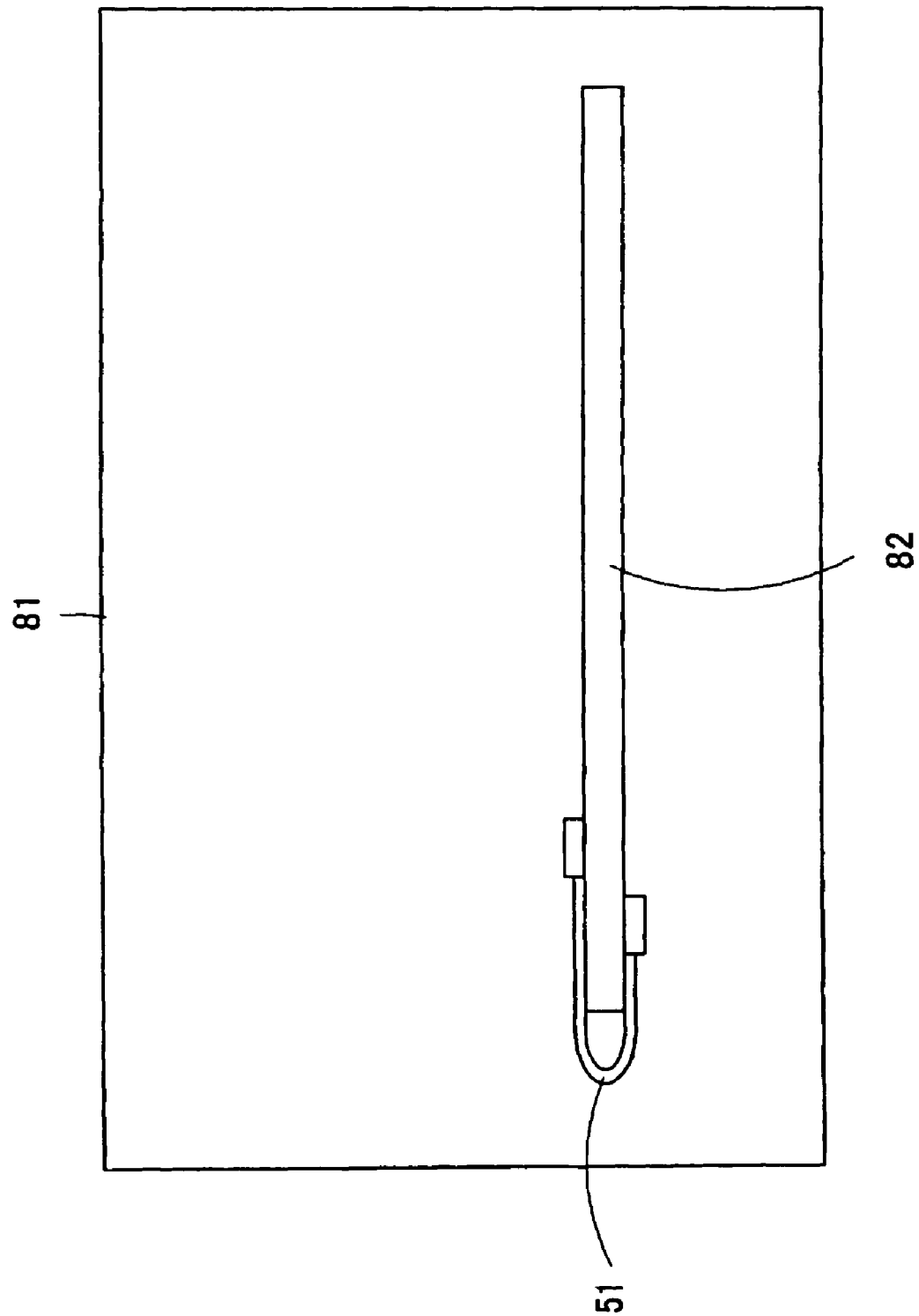
FIG. 26 is a view showing another example of a connecting mode of the film waveguide to an electronic circuit substrate.
Figure 27:
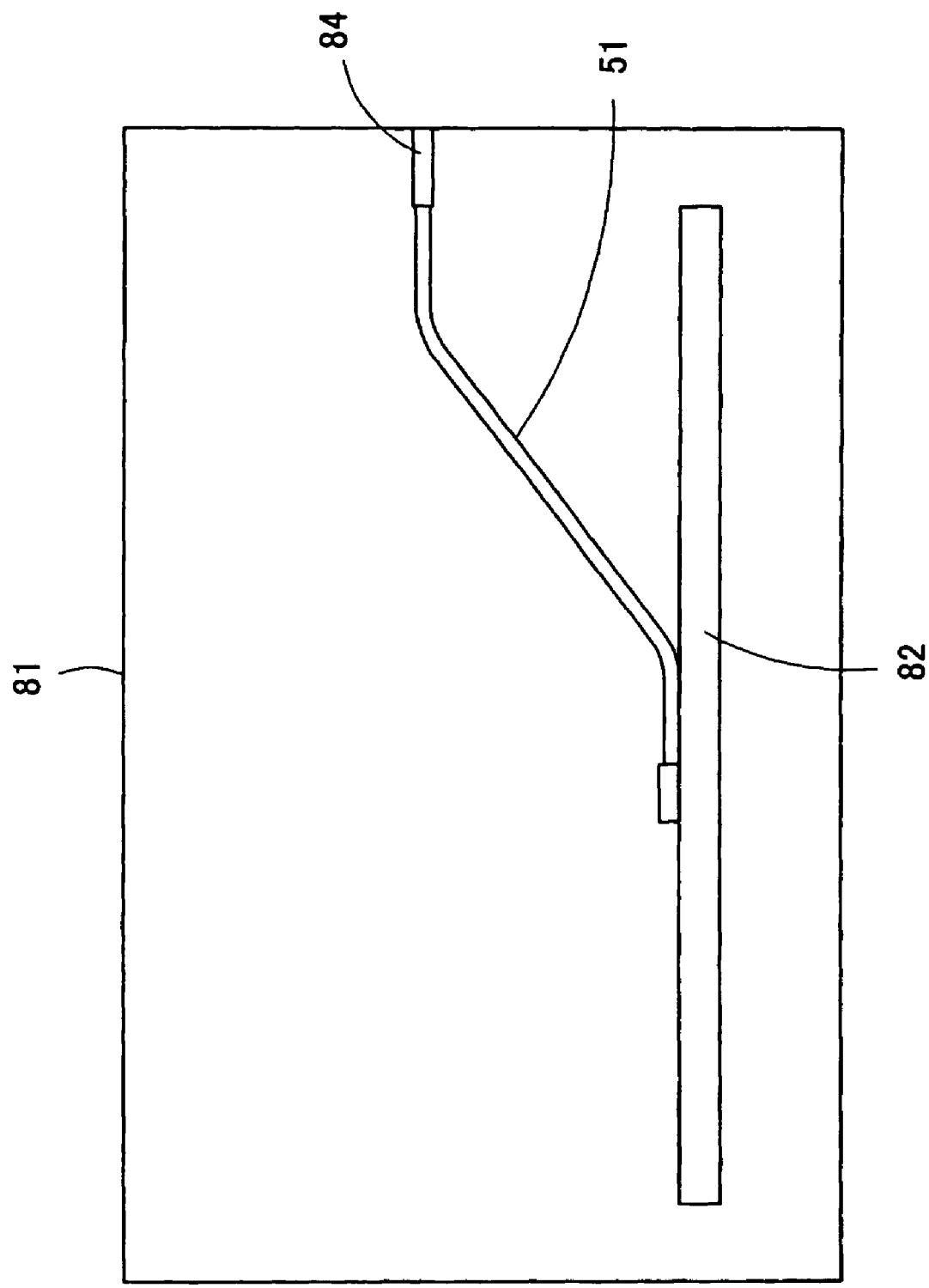
FIG. 27 is a view showing another further example of a connecting mode of the film waveguide to an electronic circuit substrate.

FIGS. 25 to 27 show an embodiment of a connecting mode of the film waveguide 51 to the electronic circuit substrate. That is, in the mode shown in FIG. 25, the film waveguide 51 is bent so as to connect the separate electronic circuit substrates 82, 83 in the device 81. In the mode shown in FIG. 26, the film waveguide 51 connects the front and the back of the electronic circuit substrate 82. In the mode shown in FIG. 27, the film waveguide 51 connects the electronic circuit substrate 82 and the connector 84. In any one of the connecting modes, high-speed, large volume communication between the electronic circuit substrates positioned in a limited space is realized.

EMBODIMENT 9

Figure 28:
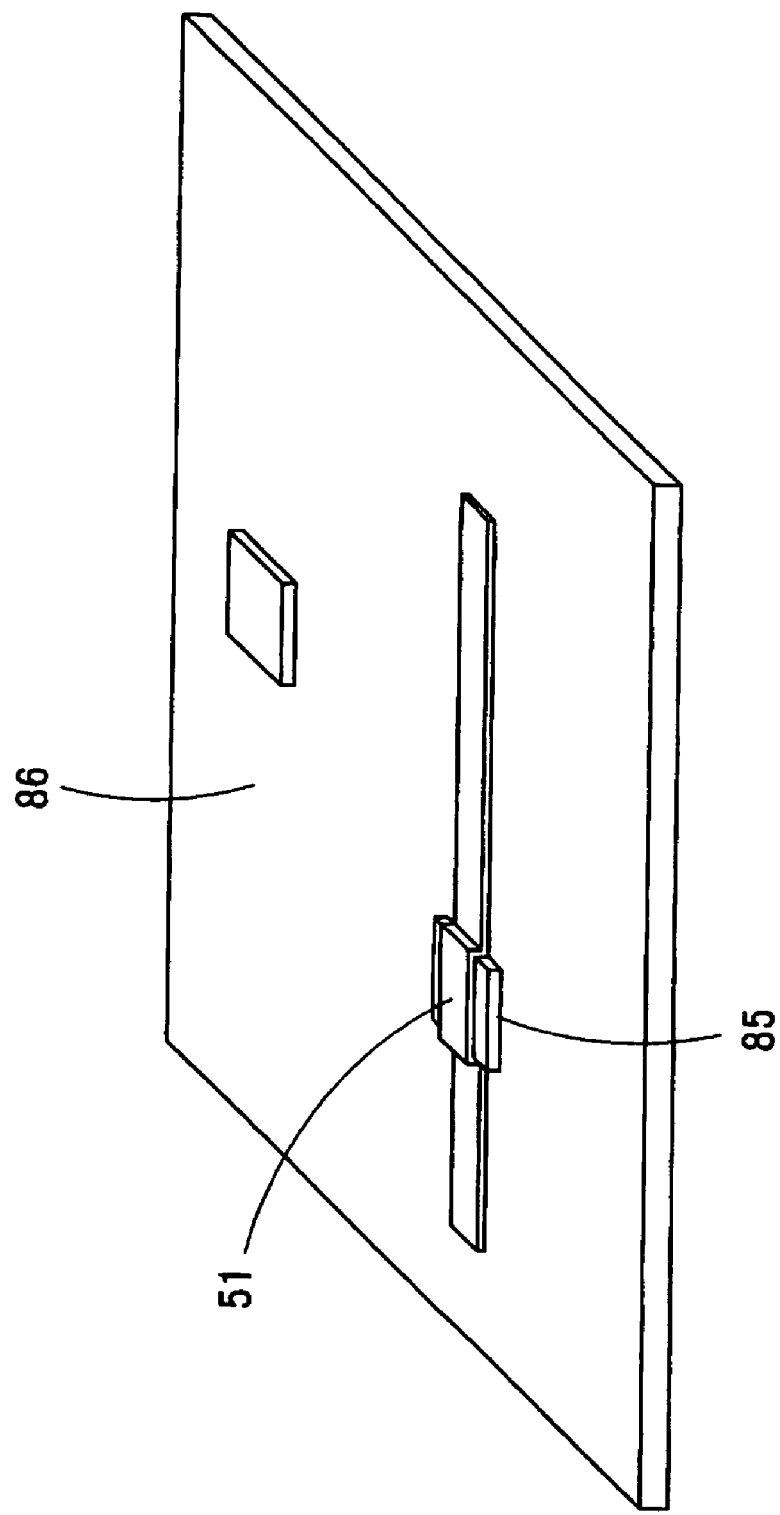
FIG. 28 is a perspective view showing another usage method of the film waveguide according to the present invention.

FIG. 28 is an embodiment showing another usage method of the film waveguide 51 according to the present invention. In Embodiment 9, the film waveguide 51 is arranged along the surface of a concave-convex part 85 in an electronic circuit substrate 86 including the concave-convex part 85, for example, the electronic circuit substrate 86 mounted with electronic components and the like and formed with the concave-convex part 85. According to the this embodiment, the film waveguide can be used as a transmission path etc. connecting between electronic circuit substrates mounted with electronic components, whereby high-speed and large volume communication in the electronic circuit substrate is realized.

EMBODIMENT 10

Figure 29:
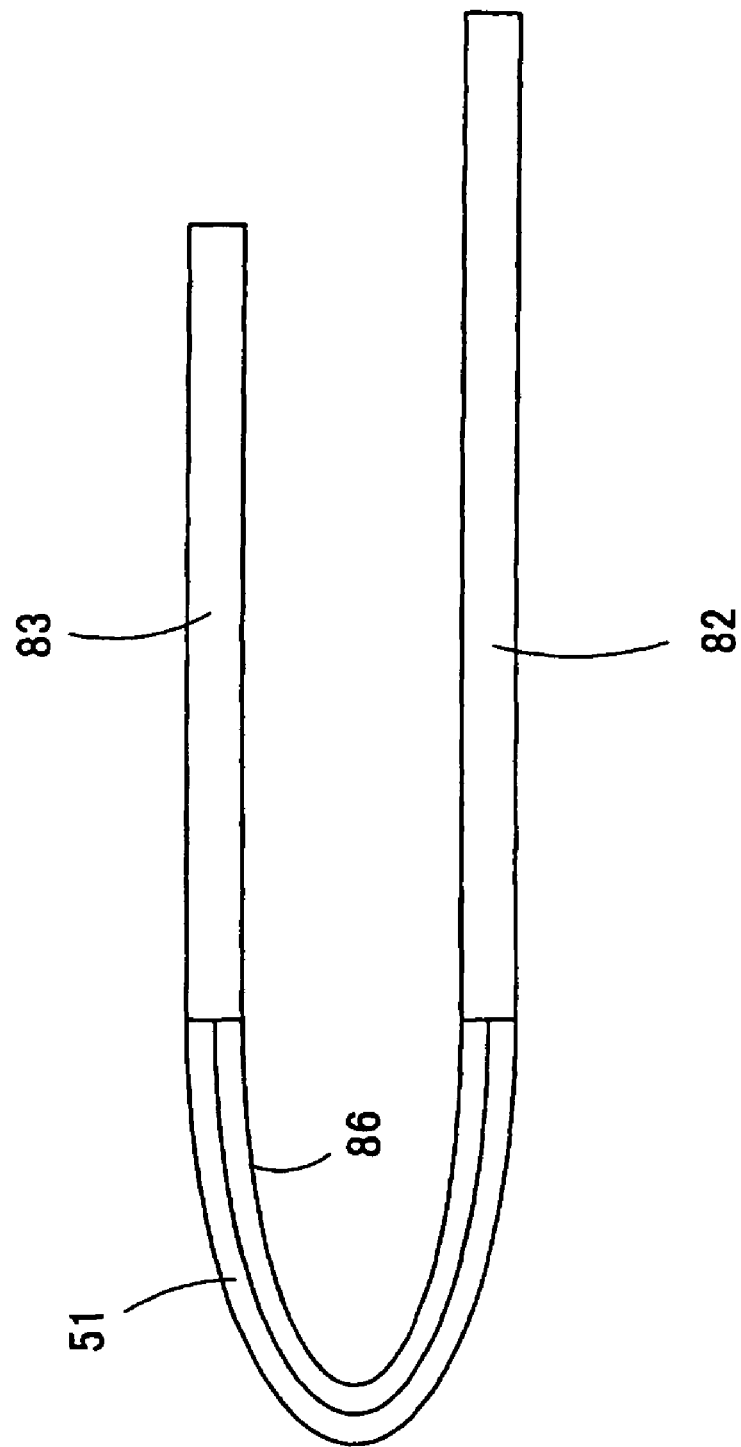
FIG. 29 is a side view showing a flexible complex transmission path in which the film waveguide according to the present invention and a flexible print wiring substrate are superimposed.

FIG. 29 is an embodiment showing another further usage method of the film waveguide 51 according to the present invention. In Embodiment 10, the film waveguide 51 is superimposed on the flexible electronic circuit substrate 86. According to such mode, the film waveguide 51 is superimposed on the flexible electronic circuit substrate 86. According to such mode, the flexible complex transmission path including power transmission and calculation function by the flexible electronic circuit substrate 86, and including high-speed, large volume communication function is realized.

The invention claimed is:

1. A method of manufacturing a film waveguide comprising:
   supplying a precursor consisting of monomer or oligomer of an elastomer having a flexural modulus after curing smaller than or equal to 1,000 MPa to a substrate;
   pressing a stamper on the precursor of the elastomer, applying pressure to the precursor of the elastomer by the stamper and thinning a film thickness of the precursor of the elastomer;
   forming a lower clad layer by curing the precursor of the elastomer;
   forming a core on the lower clad layer; and
   forming an upper clad layer on the lower clad layer and the core.

2. A method of manufacturing a film waveguide comprising:
   forming a lower clad layer;
   forming a core on the lower clad layer;
   supplying a precursor consisting of monomer or oligomer of an elastomer having a flexural modulus after curing smaller than or equal to 1,000 MPa to the lower clad layer and the core;
   pressing a stamper on the precursor of the elastomer, applying pressure to the precursor of the elastomer by the stamper and thinning a film thickness of the precursor of the elastomer; and
   forming an upper clad layer by curing the precursor of the elastomer.

3. A method of manufacturing a film waveguide comprising:
   supplying a precursor consisting of monomer or oligomer of an elastomer having a flexural modulus after curing smaller than or equal to 1,000 MPa to a first substrate;
   pressing a stamper on the precursor of the elastomer, applying pressure to the precursor of the elastomer by the stamper and thinning a film thickness of the precursor of the elastomer;
   forming a lower clad layer by curing the precursor of the elastomer;
   supplying a precursor consisting of monomer or oligomer of an elastomer having a flexural modulus after curing smaller than or equal to 1,000 MPa to a second substrate;
   pressing a stamper on the precursor of the elastomer supplied to the second substrate, applying pressure to the precursor of the elastomer by the stamper and thinning a film thickness of the precursor of the elastomer;
   forming an upper clad layer by curing the precursor of the elastomer supplied to the second substrate; and
   laminating the lower clad layer and the upper clad layer so as to sandwich a core formed in the lower clad layer or the upper clad layer.

4. A method of manufacturing a film waveguide comprising:
   supplying a precursor consisting of monomer or oligomer of an elastomer having a flexural modulus after curing smaller than or equal to 1,000 MPa to a first substrate;
   pressing a stamper on the precursor of the elastomer, applying pressure to the precursor of the elastomer by the stamper and thinning a film thickness of the precursor of the elastomer;
   forming a lower clad layer by curing the precursor of the elastomer;
   supplying a precursor consisting of monomer or oligomer of an elastomer having a flexural modulus after curing smaller than or equal to 1,000 MPa to a second substrate;
   pressing a stamper on the precursor of the elastomer supplied to the second substrate, applying pressure to the precursor of the elastomer by the stamper and thinning a film thickness of the precursor of the elastomer;
   forming an upper clad layer by curing the precursor of the elastomer supplied to the second substrate; and
   laminating the lower clad layer and the upper clad layer with a core material, and forming a core by the core material between the lower clad layer and the upper clad layer.

* * * * *